US012128436B1

(12) United States Patent
Cooper et al.

(10) Patent No.: US 12,128,436 B1
(45) Date of Patent: Oct. 29, 2024

(54) AIR-ATOMIZING ELECTROSTATIC SPRAY SYSTEM

(71) Applicant: Electrostatic Spray Innovations, LLC, Athens, GA (US)

(72) Inventors: Steven Craig Cooper, Athens, GA (US); Dae-Woong Kim, Suwanee, GA (US); John Daniel Stevens, Oxford, GA (US); Joshua Daniel Petty, Bethlehem, GA (US); Bradford A. Range, Dacula, GA (US)

(73) Assignee: ECLIPSE VENTURE, LLC, Lewes, DE (US)

( * ) Notice: Subject to any disclaimer, the term of this patent is extended or adjusted under 35 U.S.C. 154(b) by 233 days.

(21) Appl. No.: 17/554,965

(22) Filed: Dec. 17, 2021

Related U.S. Application Data

(60) Provisional application No. 63/128,425, filed on Dec. 21, 2020.

(51) Int. Cl.

| | |
|---|---|
| ***B05B 5/03*** | (2006.01) |
| ***B05B 5/00*** | (2006.01) |
| ***B05B 5/043*** | (2006.01) |
| ***B05B 5/053*** | (2006.01) |
| ***B05B 5/16*** | (2006.01) |

(52) U.S. Cl.
CPC .............. *B05B 5/032* (2013.01); *B05B 5/001* (2013.01); *B05B 5/043* (2013.01); *B05B 5/0533* (2013.01); *B05B 5/1691* (2013.01)

(58) Field of Classification Search
CPC ......... B05B 5/032; B05B 5/001; B05B 5/043; B05B 5/0533; B05B 5/1691; B05B 5/03; B05B 5/053; B05B 15/55; B05B 7/1486
See application file for complete search history.

(56) References Cited

U.S. PATENT DOCUMENTS

| | | | | |
|---|---|---|---|---|
| 3,698,635 | A | 10/1972 | Sickles | |
| 4,004,733 | A | 1/1977 | Law | |
| 4,009,829 | A | 3/1977 | Sickles | |
| 4,106,697 | A | 8/1978 | Sickles et al. | |
| 4,186,886 | A | 2/1980 | Sickles | |
| 4,240,585 | A | 12/1980 | Sickles | |
| 4,343,433 | A | 8/1982 | Sickles | |
| 5,478,014 | A * | 12/1995 | Hynds | B05B 7/0815 239/397.5 |
| 5,704,554 | A | 1/1998 | Cooper et al. | |

(Continued)

*Primary Examiner* — Christopher R Dandridge
(74) *Attorney, Agent, or Firm* — Crowe & Dunlevy LLC; Andre M. Szuwalski

(57) ABSTRACT

A spray system includes a spray device with a housing enclosing an electrostatic power supply that generates an electrostatic charging voltage and a nozzle assembly including a liquid tip that receives a spray liquid and an air stream and emits an atomized spray and an electrode coupled to receive the electrostatic charging voltage and configured to inductively charge the spray. A base unit includes a liquid source that supplies the spray liquid, an air source that supplies the air stream and a power source that supplies power for the electrostatic power supply. A tether couples the spray device to the base unit. The tether includes a liquid supply line coupling the liquid source to the liquid tip, an air supply line coupling the air source to the liquid tip, and a power supply line coupling the power source to the electrostatic power supply.

39 Claims, 16 Drawing Sheets

(56) References Cited

U.S. PATENT DOCUMENTS

| | | | |
|---|---|---|---|
| 5,765,761 A | 6/1998 | Law et al. | |
| 6,227,466 B1 | 5/2001 | Hartman et al. | |
| 7,712,687 B2 * | 5/2010 | Wilson | B05B 5/1691 239/708 |
| 7,913,938 B2 | 3/2011 | Cooper | |
| 8,166,912 B2 * | 5/2012 | Ko | B05B 5/10 118/308 |
| 8,746,597 B2 | 6/2014 | Sides | |
| 9,138,760 B2 | 9/2015 | Cooper | |
| 9,144,811 B2 | 9/2015 | Cooper | |
| 10,322,424 B2 | 6/2019 | Wright | |
| 10,434,525 B1 * | 10/2019 | Cooper | B05B 7/0815 |
| 2016/0303335 A1 | 10/2016 | Hong | |
| 2017/0173607 A1 * | 6/2017 | Wright | B05B 9/0861 |
| 2019/0060922 A1 | 2/2019 | Wright | |
| 2020/0121867 A1 | 4/2020 | Wright | |
| 2021/0252533 A1 | 8/2021 | Wright | |

* cited by examiner

AIR-ATOMIZING ELECTROSTATIC SPRAY SYSTEM

PRIORITY CLAIM

This application claims priority from U.S. Provisional Application for Patent No. 63/128,425 filed Dec. 21, 2020, the disclosure of which is incorporated herein by reference.

TECHNICAL FIELD

Modes of implementation and embodiments relate to an atomizing electrostatic spray system and, in particular, to a portable atomizing electrostatic spray apparatus.

BACKGROUND

An electrostatic sprayer delivers highly charged particulates that can effectively enhance spray coverage uniformity and mass-transfer efficiency onto desired targets. Presently, electrostatic techniques are used to dispense powder or liquid coating compounds in a number of different technology areas (for example, agricultural crop spraying and painting of automobiles, appliances, furniture, and many other manufactured goods). Benefits include reduced waste and improved surface coating. Human and animal healthcare are critical emerging areas that can also benefit from electrostatic sprays for the prevention of serious illness caused by virus and bacteria in the environment. An electrostatic sprayer has the ability to deposit sanitizers and disinfectant agents more effectively on hidden areas.

A suitably high particulate charge level is necessary to create space-charge and image-charge fields for optimizing electrostatic deposition. There are many methods to charge spray and the choice of the electrostatic charging method employed often depends on the spray application situation. For example, ion generating devices or triboelectric charging systems may be suitable for charging non-conductive powder particles. For charging non-conductive liquids, electrohydrodynamic techniques can be used. For conductive liquids, direct charging methods may be appropriate. However, it has proven to be difficult to achieve and maintain a suitable charge level with highly conductive formulations which are subject to high voltage directly applied to the liquid. Electrostatic spray methods utilizing non-contact induction principles for droplet charging have advantages over direct-contact methods; especially in situations where highly conductive liquids are used. With non-contact induction methods, high levels of droplet charge-to-mass can be achieved while the liquid at the fluid tip and within the holding reservoir is maintained at a low or near zero voltage.

Air assisted delivery in addition to electrostatic charging can be used to improve spray coating characteristics in complex target systems. Without proper air assistance, charged spray tends to deposit more heavily onto closer surfaces or surfaces with shapes of sharper curvature that concentrate the space charge field and less heavily in electrostatically shielded areas. Agriculture pesticide sprays or certain disinfecting spray environments, where there are three-dimensional target shapes or situations where there are competing air currents, can benefit from air delivery of charged droplets. In disinfecting scenarios, electrostatic charging coupled with air delivery can also improve the speed at which a human operator or robot applicator can move to treat sizable target areas such as hotels, hospitals, restaurants, theaters, sports venues, schools, day care centers, nursing homes, military installations, airplanes, public transportation, cruise ships, etc.

Induction-charging electrostatic spray systems, such as those disclosed, for example, by U.S. Pat. Nos. 4,009,829, 4,106,697, 4,186,886 and 8,746,597 (incorporated herein by reference), utilize exposed exterior electrodes placed in the vicinity of the exit of the atomized spray from the nozzle tip. Because of the proximity of the electrode to the spray atomization zone, these devices require voltages in the range of 10 to 20 KV to power the electrodes. In addition, the electrodes are exposed to the operator, which presents an operating hazard. The exposed electrodes are further subject to wetting by liquid sprays. As a result, there can be a reduction in the spray charge and a drawing of leakage current from the power supply.

Past designs of embedded-electrode types of air-assisted electrostatic sprayers, such as those taught by U.S. Pat. Nos. 4,343,433, 4,004,733, 5,704,554, 6,227,466, 7,913,938, 5,765,761, 9,138,760 and 9,144,811 (incorporated by reference) utilize interior electrodes having the advantage of higher charging fields and lower voltage requirements due to very close proximity of electrode to the liquid tip outlet. They also utilize air shear forces to atomize the spray rather than atomization by hydraulic pressure (such as the hydraulic atomization method used in U.S. Pat. No. 8,746,597) to provide a beneficially narrow droplet size spectrum and droplets of a size optimized to charge and move under electric fields produced by the space charge of the spray. However, many of these devices utilize a source of high pressure compressed air in the range of 14.5 to 46 psi (100 to 320 kPa) to overcome internal pressure losses due to fittings and restrictions in the nozzle air paths, and to provide sufficient air energy (velocity and mass) to properly atomize and propel spray from induction charging devices as well as keep the closely spaced electrodes clean and separated from the conductive liquid at the liquid tip outlet. At lower air pressures, however, the spray from these devices does not atomize properly and the internal electrode channel becomes wet resulting in a significantly reduced level of charging and an increase in current drain from the electrostatic power supply. In addition, the embedded electrodes are in direct surface contact with the dielectric liquid tips in these designs, resulting in shorting when the area surrounding the liquid tip becomes wetted as air pressure is reduced. Due to the higher relative air pressures required to atomize and prevent electrode wetting, as well as the narrow air passages and resulting pressure losses, it is required to utilize high pressure, positive displacement compressor devices (such as piston, vane or screw types) which are costly, heavy to carry and are energy intensive.

There is a need in the art to provide a portable electrostatic spray system that atomizes, propels and charges spray effectively with lower pressure air compressor systems, such as with a turbine or turbofan, which are less costly, lighter and operate at relatively lower power inputs.

SUMMARY

In an embodiment, a spray system comprises: a spray device with a housing that encloses an electrostatic power supply configured to generate an electrostatic charging voltage and a nozzle assembly including a liquid tip configured to receive a spray liquid and an air stream and atomize the spray liquid to emit an atomized spray at a spray outlet and further including an electrostatic charging electrode electrically coupled to receive the electrostatic charging voltage and configured to inductively charge the atomized spray; a base unit that includes a liquid source configured to supply the spray liquid, an air source configured to supply the air stream and a power source circuit configured to generate a supply power for the electrostatic power supply; and a tether coupling the spray device to the base unit, wherein said tether includes a liquid supply line coupling the liquid source to the liquid tip, an air supply line coupling the air source to the liquid tip, and a power supply line coupling the power source circuit to the electrostatic power supply.

In an embodiment, the nozzle assembly includes: an electrode cap; an electrostatic charging electrode mounted within the electrode cap, said electrostatic charging electrode including an electrode channel; and a liquid tip comprising: a ring support; a central body including a liquid channel; and a plurality of insulating standoffs radially extending outwardly from the central body to said ring support. The ring support is mounted to the electrode cap with the plurality of insulating standoffs positioning the liquid channel in alignment with the electrode channel.

BRIEF DESCRIPTION OF THE DRAWINGS

Other advantages and features of the invention will become apparent on examining the detailed description of completely non-limiting modes of implementation and embodiments and the appended drawings, in which.

DETAILED DESCRIPTION

Figure 1A:
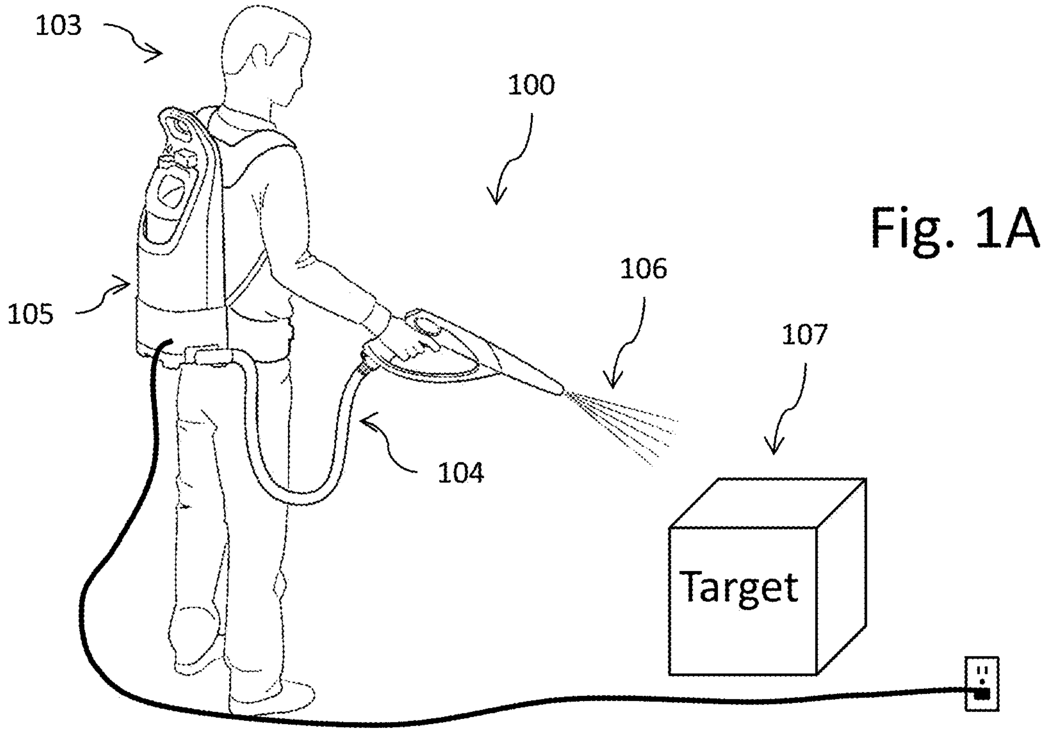
FIGS. 1A-1B are pictorial diagrams depicting operation of a handheld air assisted atomizing electrostatic spray system.
Figure 1B:
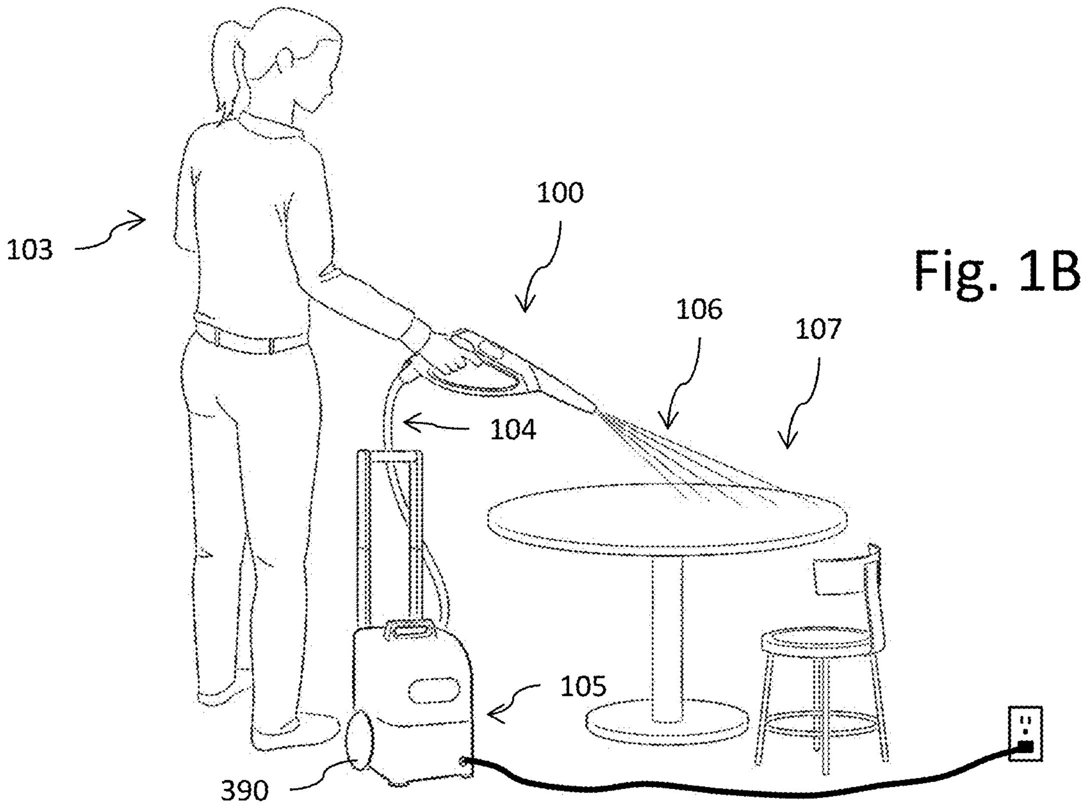

Reference is now made to FIGS. 1A-1B which show a system and method for electrostatically spraying target items with a liquid solution (for example, a disinfecting solution). A single-handed handheld spray device 100 is held by an operator 103 and actuated to dispense an air assisted and electrostatically-charged atomized spray 106 directed at a spray target 107. The spray device 100 is an electrostatic spray device in accordance with an embodiment as illustrated in further detail below. The spray device 100 is advantageously manipulated by the operator 103 using only a single hand. This leaves the operator's other hand free to perform other tasks. The spray device 100 is coupled by a coupling tether 104 to a base unit 105 that provides a source of the liquid to be sprayed, a source of air for atomized spray delivery, and a source of power for electrostatic charging of the spray. The tether 104 includes a liquid line, an air supply line and electrical cabling. The base unit 105 includes a liquid tank and a liquid pump actuatable to draw liquid from the tank and deliver the liquid through the liquid line of the tether 104 to the spray device 100. The liquid provided by the tank may comprise a conductive liquid such as a water-based disinfecting solution. The base unit 105 further includes an air source actuatable to supply a stream of air through the air line of the tether 104 to the spray device 100. The base unit 105 still further includes a power supply unit that is powered from an AC mains line connection (plug-in power cord). The power supply unit includes the circuitry necessary to supply operating power through the electrical cabling in the tether 104 to the spray device 100 for use in generating an electrostatic charge of the spray. The electrical cabling in the tether 104 includes power supply lines between the power supply unit and the spray device 100. The electrical cabling in the tether 104 further includes one or more control lines used for control signaling from the spray device 100 to control actuation of the liquid pump and the air source in response to the operator 103 actuating a spray operation using the spray device 100. The base unit 105 may be carried by the operator 103 in a backpack (FIG. 1A) or satchel or provided as a towable floor cart (FIG. 1). The charged and atomized spray liquid ejected from the tip of spray device 100 coats surfaces more uniformly and generates a liquid spray pattern that can reach hidden surfaces underneath and behind target 107 providing more effective coating than would be possible with ordinary spray apparatuses (see, FIG. 8 which illustrates a comparison of deposition characteristics for two prior art type systems and embodiments of the systems disclosed herein).

Figure 2A:
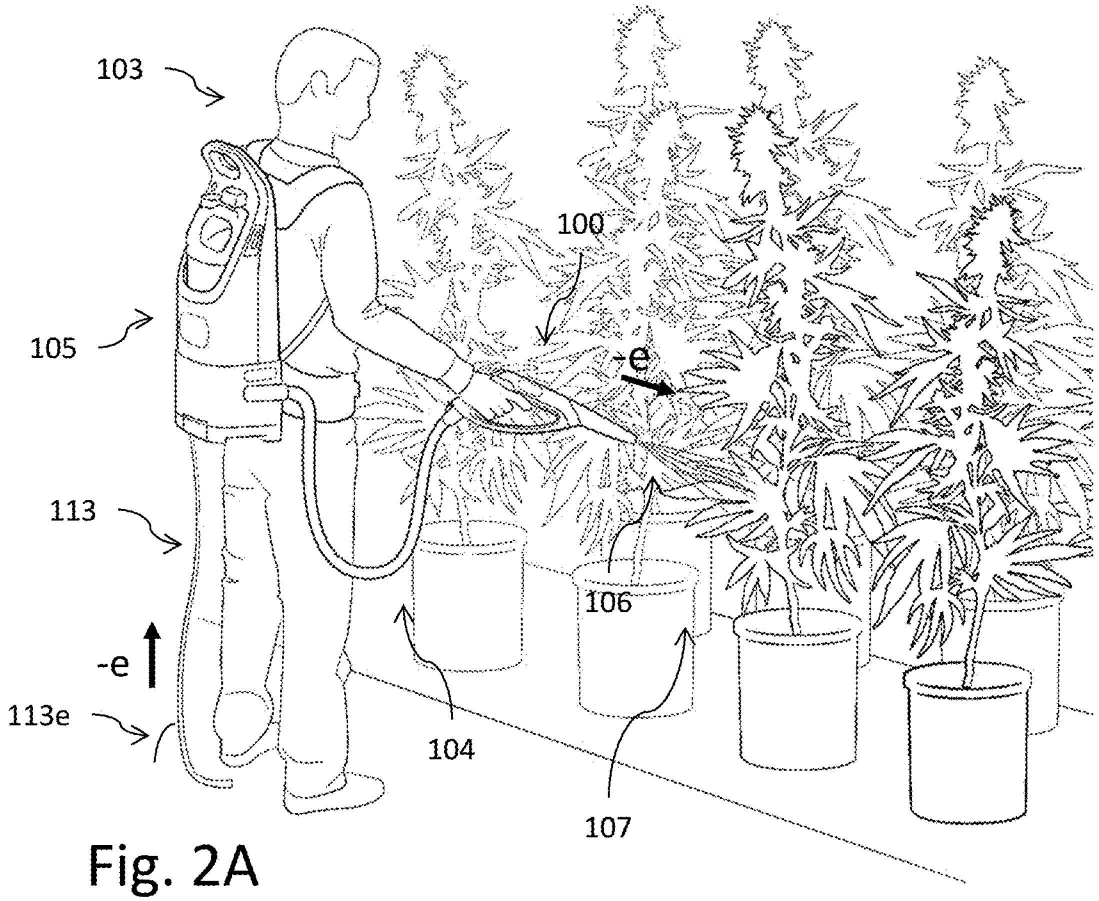
FIGS. 2A, 2B and 2C are pictorial diagrams depicting operation of alternative embodiments for a handheld air assisted atomizing electrostatic spray system.
Figure 2B:
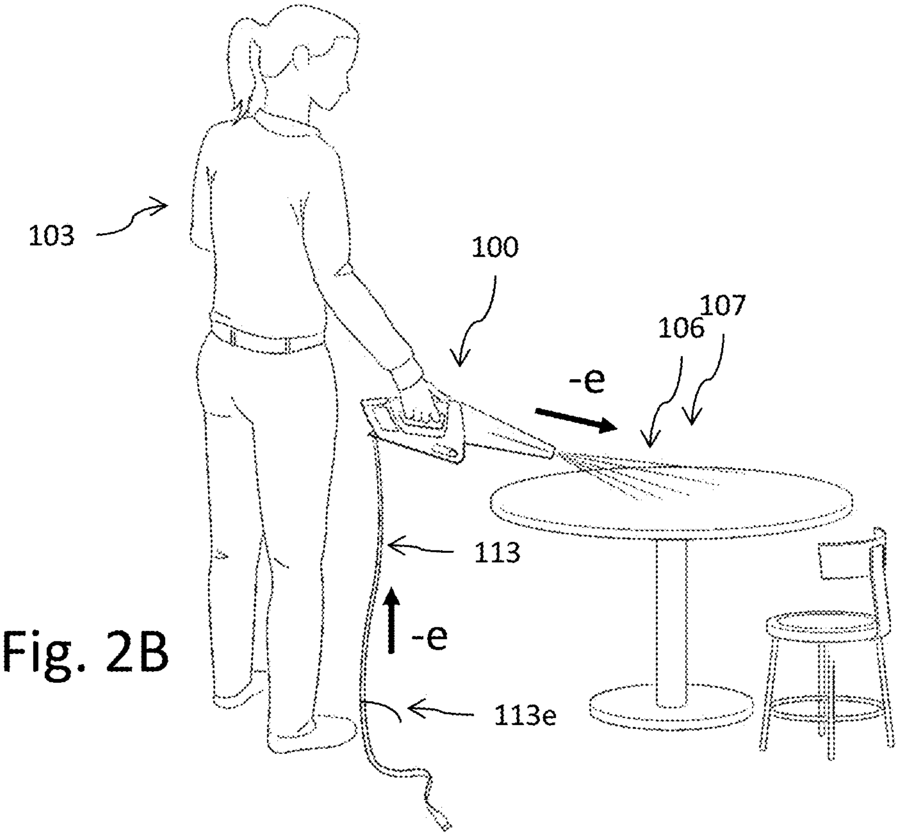
Figure 2C:
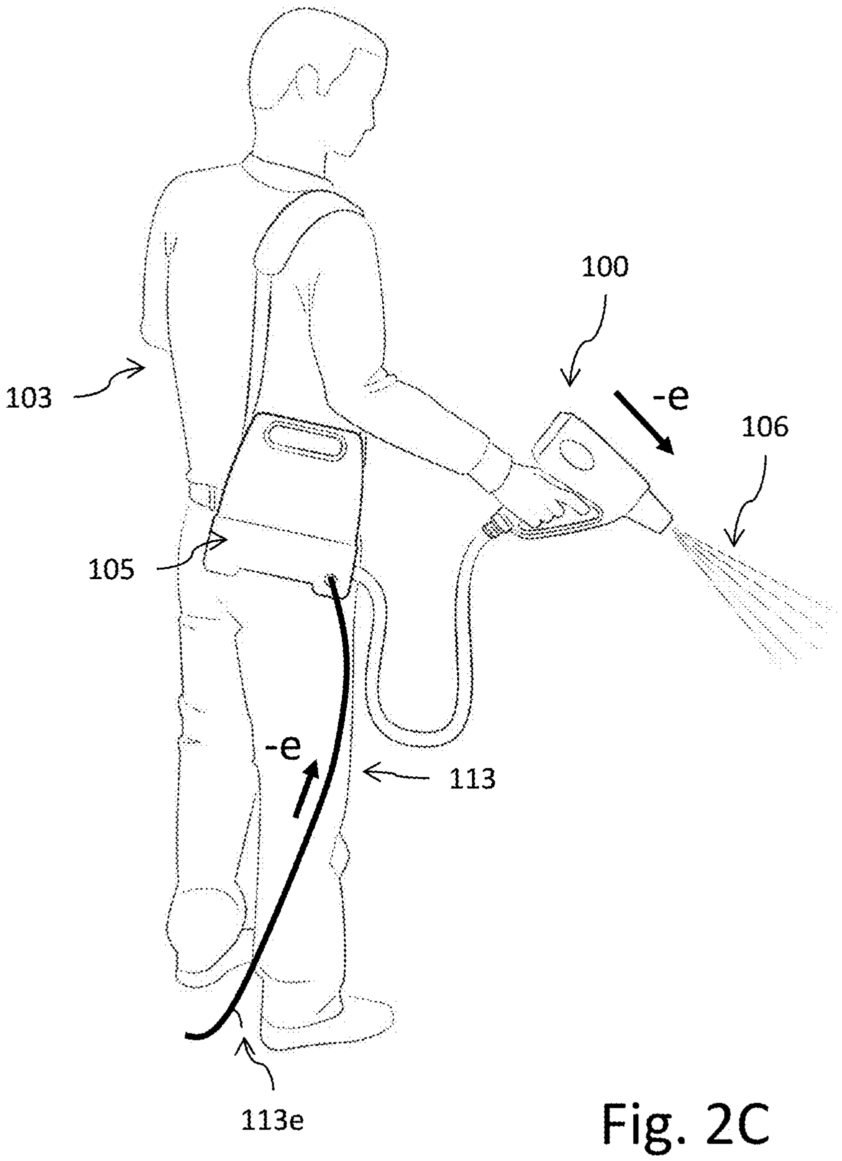

Reference is now made to FIGS. 2A, 2B and 2C which show alternative embodiments for a system and method for electrostatically spraying target items with a liquid solution (for example, a disinfecting solution). Like references refer to like or similar parts. The system of FIGS. 2A, 2B and 2C differs from that of FIGS. 1A and 1B in terms of power supply. As noted above, the system of FIGS. 1A and 1B is powered from the AC mains line connection through a plug-in power cord which provides power to a system power supply. The system of FIGS. 2A, 2B and 2C, however, is battery powered. In the FIGS. 2A and 2C implementation, the battery is mounted within the base unit 105. In the FIG. 2B implementation, the battery is mounted within the spray device 100. Furthermore, for the FIG. 2B implementation, the air source and the liquid tank are also incorporated within the spray device 100. For the FIG. 2C implementation, the air source is incorporated within the spray device 100, but the tank and pump are located within the base unit 105. It will be noted that the FIG. 2B system does not require a liquid pump as a gravity, air pressure or venturi feed from the liquid tank through a controllable valve is sufficient. The system of FIG. 2A, 2B and 2C further utilizes a floor drag tether 113 to providing a ground reference. For example, considering the case of a negatively charged spray, negative charges are induced onto the spray droplets of the electrostatically-charged spray 106 using a positive electrode and these charges are replaced by the electron (−e) flow path from the ground reference provided by the drag tether 113. This provides a higher level of more consistent spray charging as well as reduces the operator ESD voltage and current flowing through the operator. The grounding tether 113 moves with the device as it is operated (for example, sliding along the floor). The tether 113 could be incorporated into an operator's clothing or a foot strap provided it is designed so the trailing end stays on the floor while the unit is moved. The tether 113 is made of a flexible, elastic, clothlike material. Any conductive rope or chain may also be used, but a ribbon-like conductive elastic material is preferred. A small weight of electrically conductive material may be added to the distal end tip of the tether 113 to bias it down on the floor and keep the end of the tether from wearing as a result of dragging during operational movement. Although a backpack type implementation is shown in FIGS. 2A and 2C, it will be understood that a towable cart configuration (like that shown in FIG. 1B) could alternatively be used with the cart wheels 390 providing the ground connection or with the use of a drag tether 113 extending behind the cart.

Figure 12:
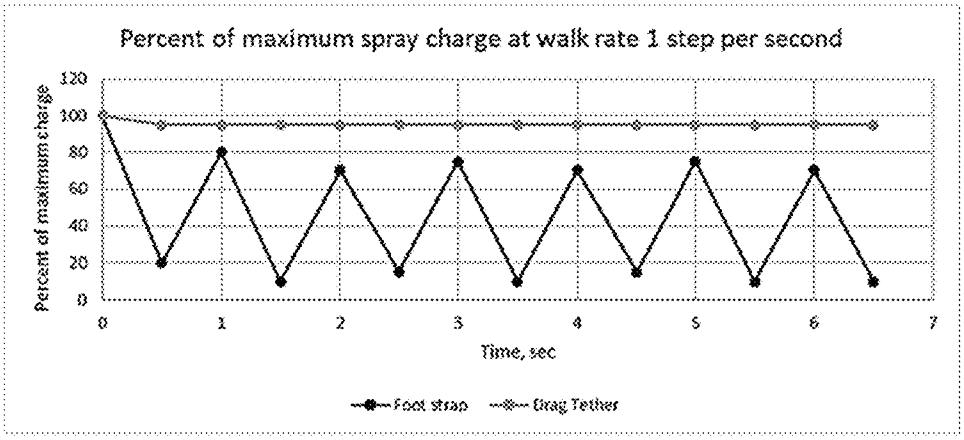
FIG. 12 shows a graph illustrating consistent spray charge when using a drag tether configuration.

With reference FIG. 12, a graph of spray charge as a function of time is presented for comparing operation where the floor drag tether 113 is utilized versus operation where a footstrap connection to the operator is utilized. There is a significant variation of induction spray charging that occurs while the operator walks (here with a pace of about 1 step per second) when utilizing the footstrap. Conversely, with the floor drag tether 113, there is little variation of induction spray charging over time as the operator walks.

With reference once again to FIGS. 1A, 1B, 2A, 2B and 2C, it will be noted that in an alternative implementation the spray system need not require a human operator. Indeed, the system could instead be implemented with a robotic platform (either AC mains or battery powered) where the base unit 105 includes a robotic ground or air movement means (either autonomously or remotely controlled) that supports spray device 100 in a gimbaled mount for robotic orientation positioning (either autonomously or remotely controlled) of the spray.

Figure 3A:
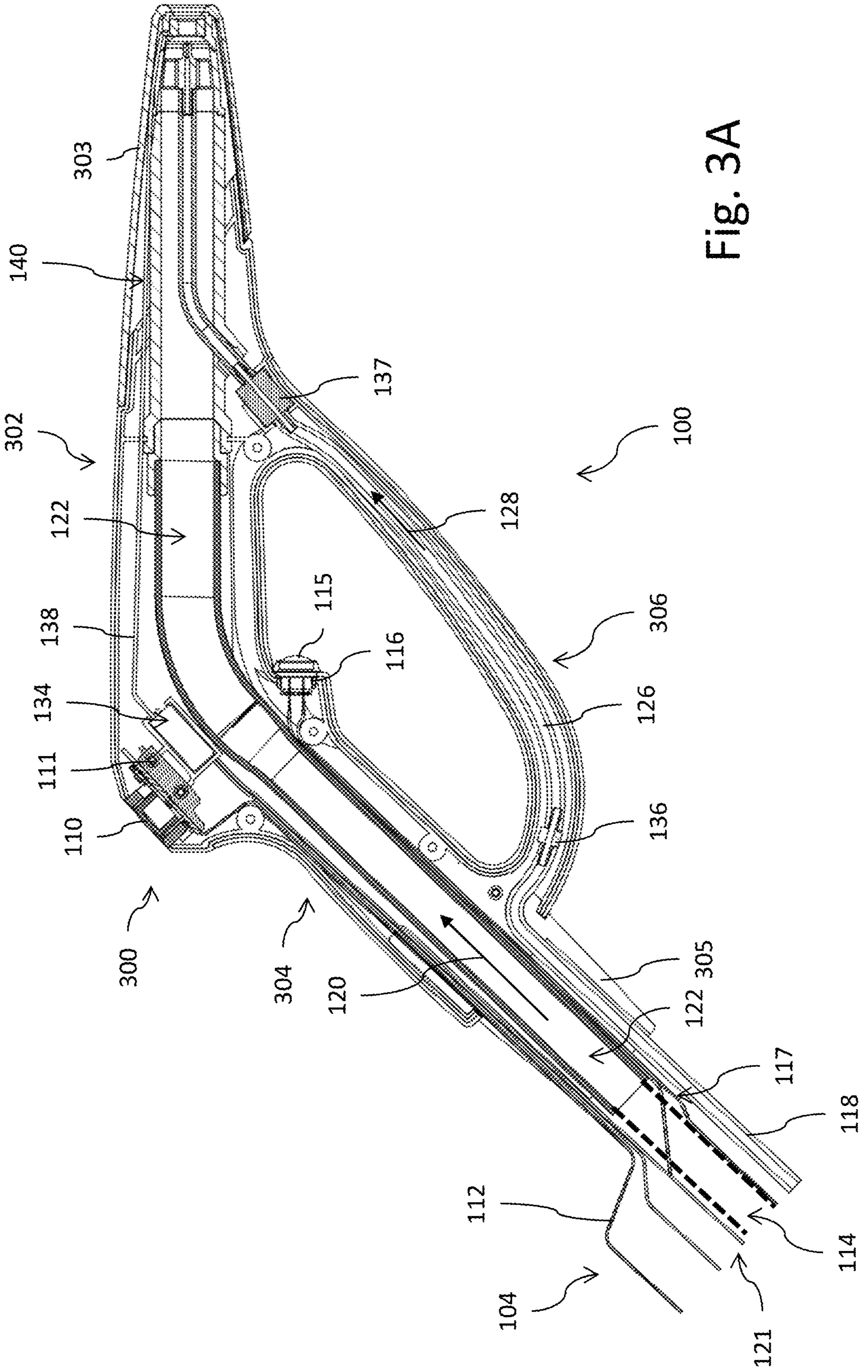
FIG. 3A is a side cross-section view of the electrostatic spray device shown in FIGS. 1A-1B and 2A.

Reference is now made to FIG. 3A which shows a side cross-section view of the electrostatic spray device 100 used in the system of FIGS. 1A, 1B and 2A. The electrostatic spray device 100 is illustrated by example only in the shape and configuration of a handgun. It will, however, be understood that other hand-held shapes and forms may instead be used (including, for example, a wand or rod).

Figure 9:
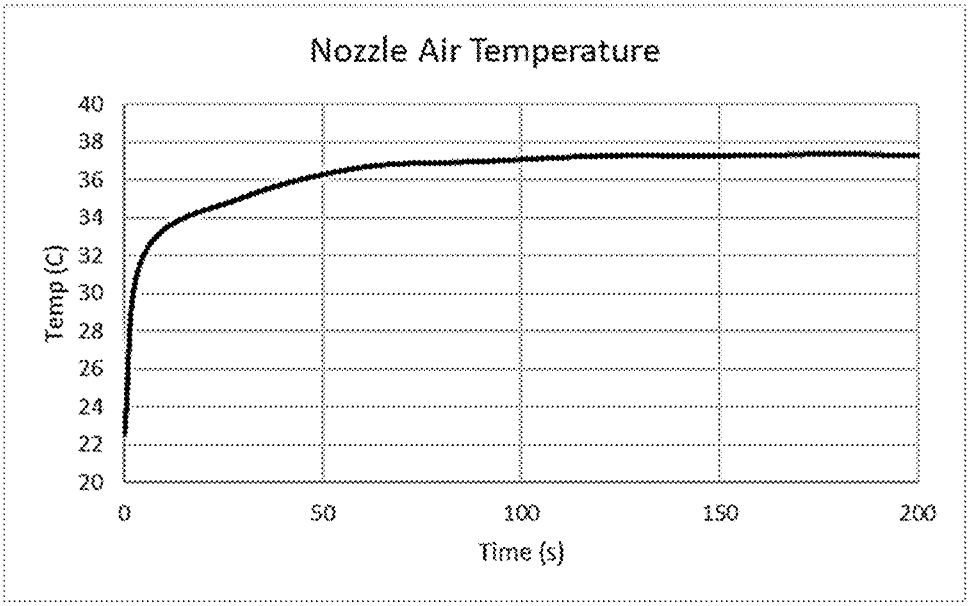
FIG. 9 shows a graph of nozzle inlet air temperature as a function of time.

Spray device 100 is operated by an air supply control button 110 functioning to control actuation of an electrical controller 111 (such as a switch or potentiometer) connected to a control line 112 that passes through the tether to the base unit. The base unit responds to the control signaling on line 112 by applying power received from the power supply unit to control actuation of a low pressure air source in the base unit that supplies air through an air supply line 114 in the tether to the electrostatic spray device 100. In a preferred implementation, the low pressure air source in the base unit is an air turbine that provides dry (low humidity, for example, less than 50%) air at a temperature of at least 5-10 degrees Centigrade above ambient at a pressure in the range of 1-5 psi. FIG. 9 shows a graph of nozzle inlet air temperature as a function of time and this illustrates in an example an increase in nozzle air temperature from ambient (approximately 22° C. or 71° F.) to spray operating (approximately 37° C. or 98° F.) within a few minutes of turning on the low pressure air source.

The spray device 100 is further operated by a spray control button 115 functioning to control actuation of an electrical controller 116 (such as a switch) connected to a control line 117 that passes through the tether to the base unit. The base unit responds to the control signaling on line 117 by applying power received from the power supply unit to control actuation of a liquid pump or other flow device such as a valve that supplies liquid through a liquid line 118 in the tether to the electrostatic spray device 100. The control signaling on line 117 further causes the base unit to supply power over power supply line 121 from the power supply unit and through the tether to an electrostatic power supply (ESPS) unit within the electrostatic spray device 100.

The air supply line 114 in the tether is coupled to the proximal end of an air tube 122 within the spray device 100 through which a low pressure air flow (arrow 120) passes. The air tube 122 is configured to pass through the handle portion of the gun-shaped spray device 100 and bend to then pass into and through the barrel portion of the gun-shaped spray device. In an embodiment, the air tube 122 is an extension of (for example, integral with or a portion of) the air supply line 114 in the tether.

The liquid line 118 in the tether is coupled to the proximal end of a liquid tube 126 within the spray device 100 through which a spray liquid flow (arrow 128) passes. The liquid line 118 is configured to pass through the trigger guard portion of the gun-shaped spray device 100 and then pass into the barrel portion of the gun-shaped spray device. A check valve 137 is provided in the liquid line 118. The check valve 137 provides an anti-drip function as well as assists in the production of a more even flow of liquid (in effect smoothing any pulse or ripple in the flow of liquid due to the operation of the liquid pump in the base unit). In an alternative embodiment, a manually or mechanically operated valve could instead be used for anti-drip. In an embodiment, the liquid tube 126 is an extension of (for example, integral with or a portion of) the liquid line 118 in the tether.

The power supply line 121 is electrically connected to an electrostatic power supply (ESPS) 134 within the spray device 100. The electrostatic power supply 134 converts the voltage provided by the power supply unit to a suitable electrostatic charging voltage on power line 138 in the range of 800-4,000 Volts, with the low (i.e., ground) voltage side of the electrostatic power supply 134 being set by the voltage level of the spray liquid flow through a liquid grounding element 136 provided in the liquid tube 126. It will also be noted that the low voltage side of the electrostatic power supply 134 may be resistively coupled to the hand of the operator 103 through a conductive or semiconductive contact on the handle portion of the gun-shaped spray device. The electrostatic charging voltage may be positive (producing a negatively charged spray in the induction system), or negative (producing a positively charged spray) with respect to the low voltage reference connected to the liquid.

The electrostatic spray device 100 further includes a spray nozzle assembly 140 that is coupled to receive the low pressure air flow from a distal end of the air tube 122, receive the spray liquid flow from a distal end of the liquid tube 126 (for example, at the output of the check valve 137) and receive the electrostatic charging voltage on power line 138 from the electrostatic power supply 134.

Figure 3B:
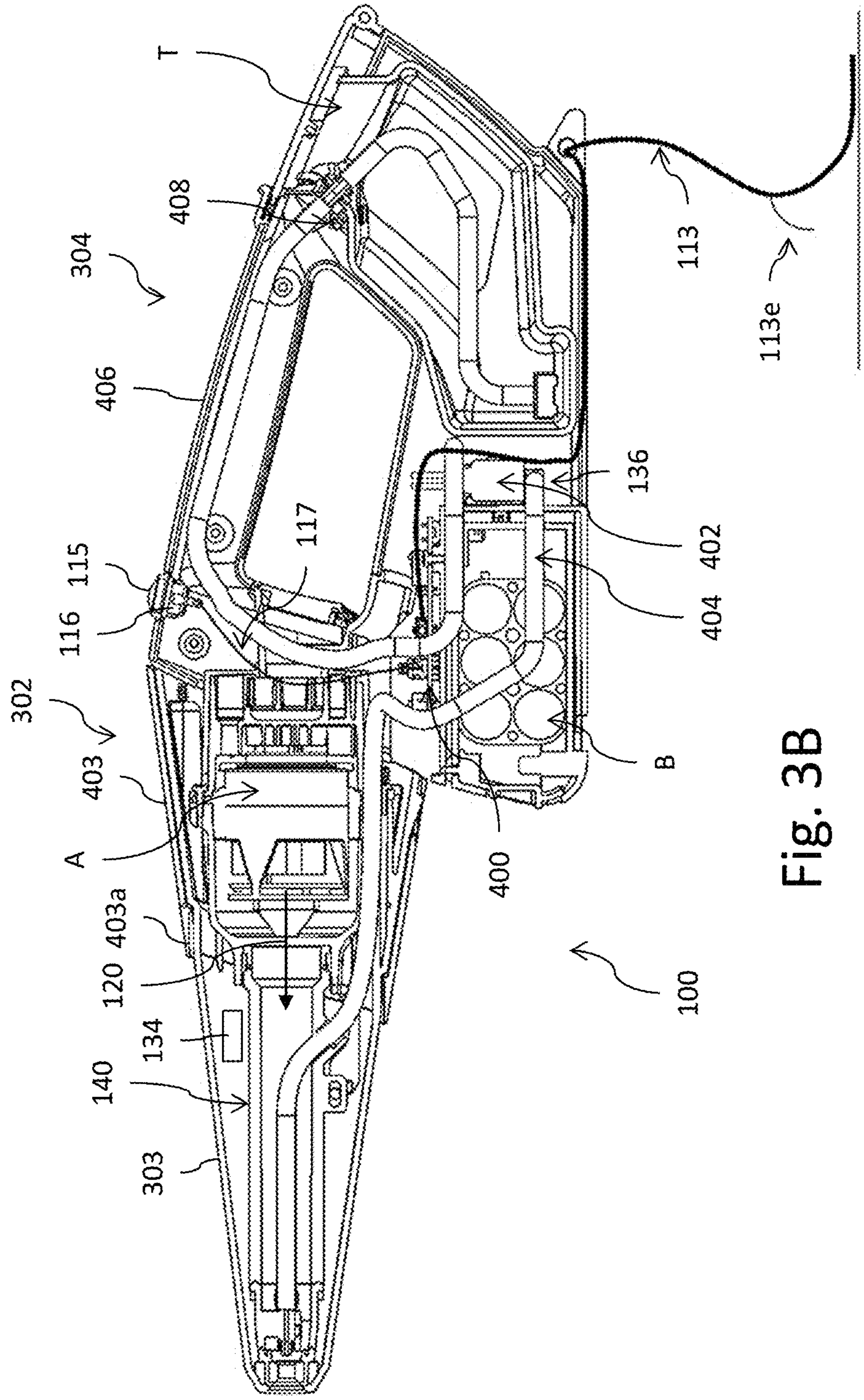
FIG. 3B is a side cross-section view of the electrostatic spray device shown in FIG. 2B.

With reference now to FIG. 3B, the implementation of the electrostatic spray device 100 used in the system of FIG. 2B is similar to that shown in FIG. 3A for use in the system of FIGS. 1A, 1B and 2A, with the exception that the body or housing of the device is configured to support inclusion of the battery B, the air source A and the liquid tank T (and thus there is no need for base unit 105). A controlled liquid valve is also provided. The spray device 100 will be of larger size than that shown in FIG. 3A, and thus a different positioning of the handle at the top of the device 100 is provided to make it easier for the operator to carry and manipulate.

The spray device 100 in FIG. 3B is operated by a spray control button 115 functioning to control actuation of an electrical controller 116 (such as a switch) connected to a control line 117 coupled to a control circuit board 400. The control circuit board 400 includes the necessary circuitry for providing motor and valve control. Power is also provided to the electrostatic power supply (ESPS) unit 134. The control circuit board 400 responds to the control signaling on line 117 by applying power received from the battery B to control actuation of the low pressure air source A that supplies a low pressure air flow (arrow 120) to a spray nozzle assembly 140. In a preferred implementation, the low pressure air source is an air turbine that provides dry (low humidity, for example, less than 50%) air at a temperature of at least 5-10 degrees Centigrade above ambient at a pressure in the range of 1-5 psi. The control circuit board 400 further responds to the control signaling on line 117 by actuating a liquid solenoid valve 402 that permits liquid to be extracted from the tank T and delivered to the spray nozzle assembly 140 over a liquid line 404. In this configuration, the tank T may be pressurized from low pressure air source A (the pressure line is not explicitly shown in FIG. 3B, but the pressure port at the tank T is provided at reference 408). Instead of a valve, a pump may be used as the flow control device. The electrostatic power supply (ESPS) unit 134 is actuated in response to control generated by the control circuit board 400 and uses power received from the battery B to generate a suitable electrostatic charging voltage in the range of 800-4000 Volts for delivery to the spray nozzle assembly 140 (see, power line 138). The low (i.e., ground) voltage side of the electrostatic power supply 134 is set by the voltage level of the spray liquid flow through a liquid grounding element 136 that is provided at one of a number of possible locations including in the liquid tube, in the tank T or at the solenoid valve 402 (as shown) if it has a conductive body. Additionally, the low voltage side of the electrostatic power supply is resistively coupled to the hand of the operator through a conductive or semi-conductive contact 406 on the handle portion of the spray device (provided, for example, using a conductive material overmold on the handle). The electrostatic charging voltage may be positive (producing a negatively charged spray in the induction system), or negative (producing a positively charged spray) with respect to the low voltage reference connected to the liquid. The spray nozzle assembly 140 is coupled to receive the low pressure air flow from an output port of low pressure air source A, receive the spray liquid flow from the liquid tube connection through valve 402 to tank T and receive the electrostatic charging voltage from the electrostatic power supply 134. The housing of the spray device 100 contains the foregoing described structures, and a removable hooded cover 403 may be mounted to the housing at a position rearward of the nozzle. The cover 403 is made of an insulating material and includes a hooded end portion 403*a* presenting an air gap and shielded interior surrounding the housing. The cover 403 provides for enhanced operation of the spray device 100 as the hooded end portion 403*a* serves to prevent leakage currents on exterior surfaces in situations of surface contamination. Spray charging has been shown to be more consistent over longer periods of time with the presence and use of the cover 403 when spraying highly conductive liquids.

Figure 3C:
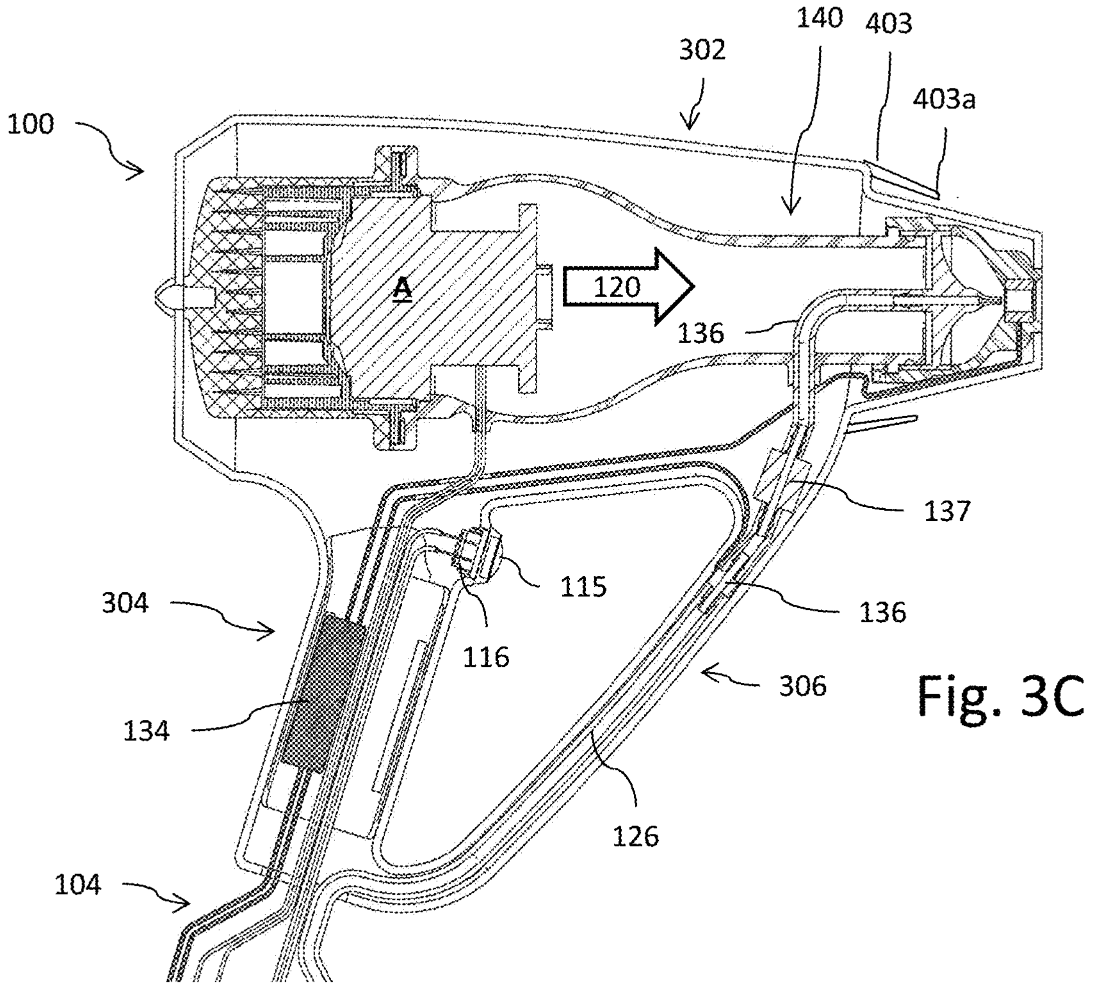
FIG. 3C is a side cross-section view of the electrostatic spray device shown in FIG. 2C.

With reference now to FIG. 3C, the implementation of the electrostatic spray device 100 used in the system of FIG. 2C is similar to that shown in FIG. 3A for use in the system of FIGS. 1A, 1B and 2A, with the exception that the body or housing of the device is configured to support inclusion of the air source A (and thus the control circuit, tank and liquid pump are provided in the base unit 105). Like references refer to like or similar parts the description of which is provided in connection with FIGS. 3A and 3B. Repeated description of these parts is omitted, and reference should be made to the previous discussion provided for FIGS. 2A and 2B.

Figure 4:
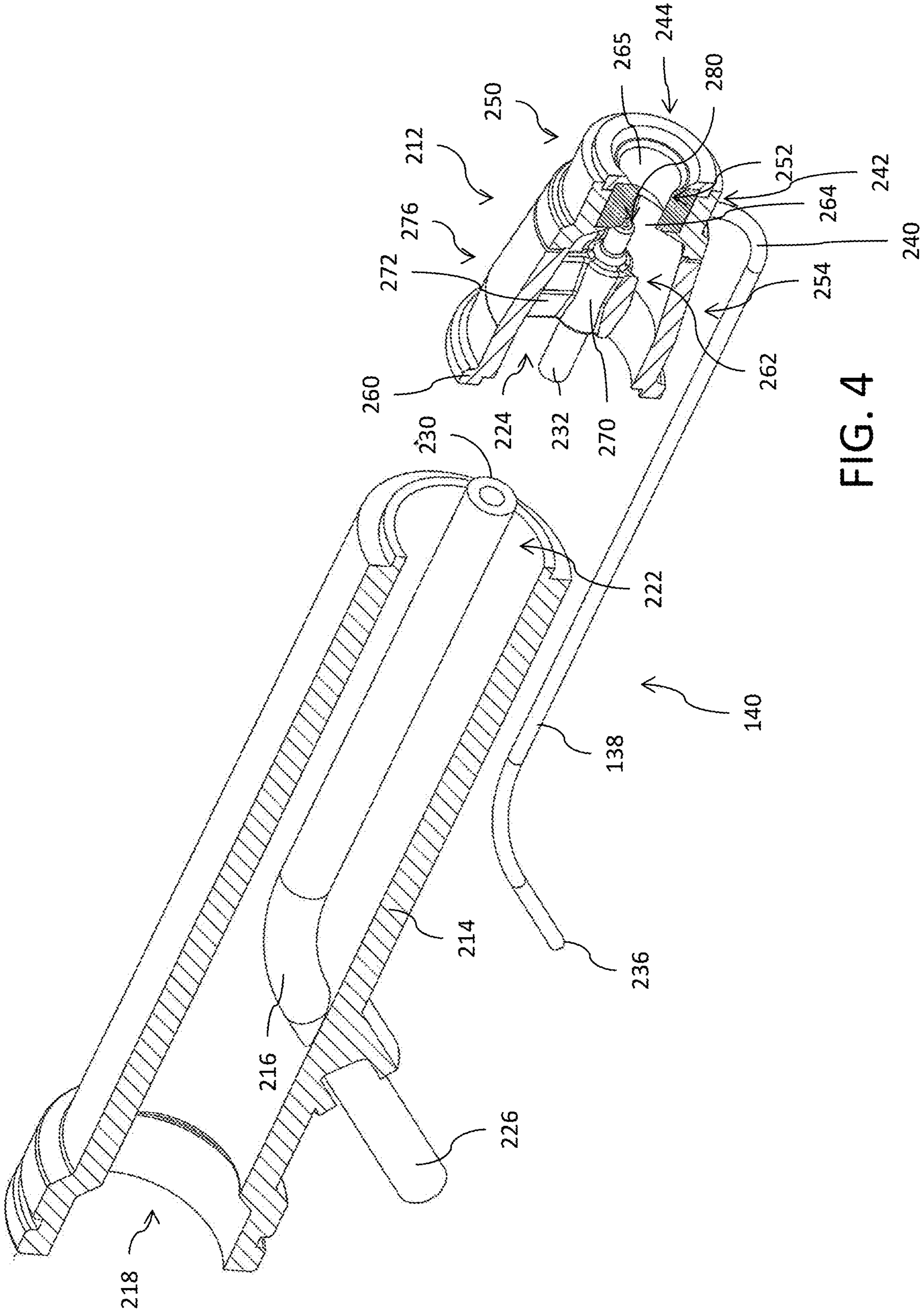
FIG. 4 shows an exploded perspective cross-sectional view of the nozzle assembly for the spray device of FIG. 3.

Reference is now made to FIG. 4 which shows an exploded cross-sectional perspective view of the spray nozzle assembly 140 used in FIGS. 3A and 3B. The spray nozzle assembly 140 includes a nozzle 212 mounted to an air duct 214 and liquid hose 216 and electrically connected to the power line 138. The air duct 214 is made of a non-conductive (i.e., electrically insulating) material and has a tubular (cylindrical) shape with a first end 218 coupled to the distal end of the air tube 122. The air duct 214 may, for example, have an inner diameter in a range of 0.5 to 1.0 inches. The nozzle 212 is mounted to a second end 222 of the air duct 214 at an air inlet 224. The liquid hose 216 extends within the air duct 214 and has a first end 226 coupled to the distal end of the liquid tube 126 (for example, at the output of the check valve 137). In an embodiment, the liquid hose 216 may pass through the wall of the air duct 214. A second end 230 of the liquid hose 216 is coupled to a liquid inlet 232 of the nozzle 212. The power line 138 (forming an electrode wire) has a first end 236 coupled to the output of the electrostatic power supply 134 and a second end 240 electrically connected to a power input 242 of the nozzle 212. The nozzle 212 further includes a spray outlet 244 from which the atomized and electrostatically charged spray is emitted.

An advantage of the configuration using nozzle 212 mounted to the end of the air duct 214 is that the axial direction of air flow through the air duct is the same axial direction of air flow through the nozzle to produce the atomized and electrostatically charged spray. Indeed, these axial directions for the air flow are aligned. There are no bends in the direction of air flow or obstructions that would cause significant disturbance in the airflow with this configuration as is commonly seen in prior art atomizing system designs. In particular, the length of the air duct 214 before the connection to the nozzle 212 is straight or slightly tapered for a distance of at least 1.5 times the diameter (preferably greater than 2 times the diameter) of the entrance to the nozzle to reduce turbulence in the air flow and shape the air velocity profile to increase the air velocity near the center of the air duct as it enters the nozzle portion.

The nozzle 212 comprises an electrode cap 250, an electrode 252 and a liquid tip 254. The liquid tip 254 comprises a central body 270, a plurality of standoffs 272 and a ring support 276. The electrode and the liquid tip are separated by an air gap and the electrode is not in direct electrical contact with the liquid at the liquid tip. The plurality of standoffs 272 radially extend outwardly (i.e., in directions perpendicular to the axial direction of air flow) from the central body 270 to the ring support 276. In an implementation, there are three standoffs 272 provided which are equally radially spaced from each other by one-hundred twenty degrees. It will be understood, however, that as few as one standoff 272 and in some cases two or three or more standoffs 272 in an equally or un-equally radially spaced apart relationship could instead be used. The central body 270, the standoffs 272 and the ring support 276 are made of a non-conductive (i.e., electrically insulating) material. In an embodiment, the assembly of the liquid tip 254 is a unitary molded body.

The proximal end of the ring 276 defines the air inlet 224 of the nozzle 212 and includes a flange 260 that provides a means for mounting the nozzle 212 to the second end 222 of the air duct 214. This means for mounting may comprise a welded (for example, sonic) connection, press fit, an adhesive fit, snap fit or a threaded or slotted interface. The electrode cap 250 is a unitary body made of non-conductive (i.e., electrically insulating) material. The proximal end of the electrode cap 250 is mounted to the distal end of the ring 276. This means for mounting likewise may comprise a welded (for example, sonic) connection, press fit, an adhesive fit, snap fit or a threaded or slotted interface.

A central bore 262 extends through the ring 276 and the electrode cap 250 from the proximal (i.e., nozzle mounting) end of the nozzle 212 to a distal (i.e., spray) end of the nozzle 212 that defines the spray outlet 244. This central bore 262 includes a first portion axially extending through the ring 276 and into the electrode cap 250 from the proximal (nozzle mounting) end. The distal end of the first portion narrows in diameter as a function of distance from the proximal nozzle mounting end to form a roughly conical or tapered shape opening. The central bore 262 further includes a second portion extending into the electrode cap 250 from the distal (spray) end, said second portion forming a cylindrical shaped opening. The first and second portions, more specifically the roughly conical or tapered shape opening and the cylindrical shaped opening, are aligned and concentric and meet within the electrode cap 250 to form a central air channel 264. This implementation advantageously fixes the relative axial alignment and positioning of the liquid tip 254 with respect to the electrode cap 250.

The second portion of the central bore 262 is sized and shaped to receive the electrode 252 within the electrode cap 250. The nozzle 212 is accordingly of the embedded-electrode type of spray nozzle. The electrode 252 is made of an electrically conducting material and has the shape of an annular (i.e., ring-shaped) body surrounding a central opening which defines an electrode channel 265. The power line 138 (electrode wire), after passing through the power input 242 of the nozzle 212 in the electrode cap 250, is electrically connected to the electrode 252. The electrode 252 functions to charge the spray emitted by the nozzle. The central opening provided by channel 265 of the electrode 252 is concentrically aligned with the central air channel 264. The diameter of the central air channel 264, in a preferred embodiment, is substantially equal to the diameter of the central opening (electrode channel) of the electrode 252. In an embodiment, the electrode 252 is press fit within the cylindrical shaped opening of the second portion of the central bore 262 at the distal end. Alternatively, the electrode 252 with attached power line 138 can be overmolded with insulating plastic, such as in an injection molded process, to form an electrode cap assembly.

It will be noted that the entire nozzle 212 assembly (with electrode cap 250, electrode 252 and liquid tip 254) may be removed as a single piece from the end of the air duct 214. It will also be noted that the air duct 214 may be provided as an extension of (for example, integral with or a portion of) the air tube 122. The central body 270 of the liquid tip 254 includes a liquid channel 279 (see, FIGS. 5 and 6B) that extends from the liquid inlet 232 of the nozzle 212 to a liquid outlet 280 positioned adjacent to, and in concentric alignment with, the central air channel 264 at a tip end. The end of the liquid tip 254 at the liquid outlet 280 does not extend into either the central air channel 264 or the electrode channel of the electrode 252. In other words, the central body 270 of the liquid tip 254 is positioned within the first portion of the central bore 262 at an axial position such that the end of the liquid tip 254 is slightly rearward (i.e., in the direction towards the air inlet—in other words, upstream —) of the location of the central air channel 264. More specifically, the end of the liquid tip 254 can be positioned within the tapered first portion of the central bore, but rearward of the location of the central air channel 264 where the first and second portions meet. This relative positioning minimizes air pressure loss and positions the liquid tip in an area of increased and directed air velocity to cause the air energy to shear the liquid emitted from the liquid tip outlet into spray droplets. It is important to note that the spray operation being performed here is an atomization with air-assisted delivery which is different from hydraulic atomizers like those shown in the prior art by U.S. Pat. Nos. 10,322,424, 10,589,298 and 8,746,597 (incorporated by reference). As a result, there is an opening up of the air flow in an area at and around the tip end of the liquid tip 254 that with previous nozzle designs (see, for example, U.S. Pat. No. 7,913,938, incorporated by reference) unacceptably experienced an airflow restriction and resulting atomization energy/pressure loss.

It is also important for the liquid outlet 280 to be axially aligned with the central opening (electrode channel 265) of the electrode 252, and this alignment is accomplished using the radially extending insulating standoffs 272 which suspend the central body 270 of the liquid tip 254 centered within the central bore. Maintaining concentricity of the electrode with the liquid tip outlet is critical. Small side-to-side variations cause atomization issues due to more airflow on one side of the liquid tip outlet. Concentricity variations also change the charging field, increasing the field intensity along one side of the tip and reducing the field intensity on the opposite side. Under such conditions, ionization of the liquid or field breakdown, e.g., arcing, may occur. A misaligned liquid tip with respect to the electrode may also cause wetting of the electrode with conductive spray solution resulting in reduced charge levels and excessive draw of power supply current.

The insulating standoffs 272 which suspend the central body 270 of the liquid tip 254 within the central bore 262 may, for example, comprise insulating fin structures having an aerodynamic shape. The aerodynamic shape is designed to minimize swirling or turbulence or otherwise which could disturb or impede the airflow around the central body 270 within the first portion of the central bore 262 and extending towards the central air channel 264.

The central body 270 of the liquid tip 254 is held in the duct airflow using the insulating standoffs 272 which function to straighten axial airflow from the duct 214 and allow air to pass over the central body 270 of the liquid tip in the axial direction without significant pressure loss. The standoffs 272 serve as electrically insulating standoffs to hold the liquid tip concentric with the electrode channel. The insulating standoffs are made of insulating material whose exterior surfaces are swept clean during operation by the passage of the heated, dry air. The passing air moves over the surface of each insulating standoff to advantageously keep the insulating standoffs clean, dry and at high electrical resistivity.

Figure 5:
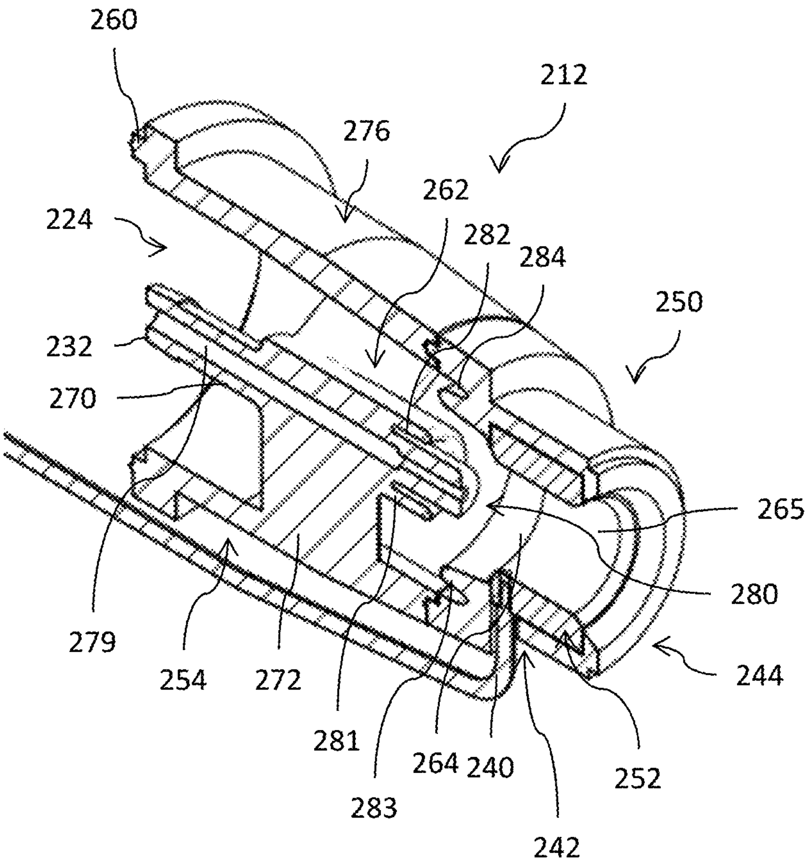
FIGS. 5 and 6A-6B show perspective cross-sectional views for an alternate configuration of the nozzle assembly.
Figure 6A:
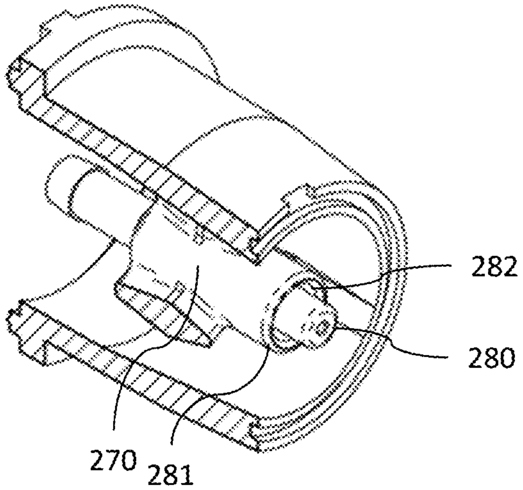
Figure 6B:
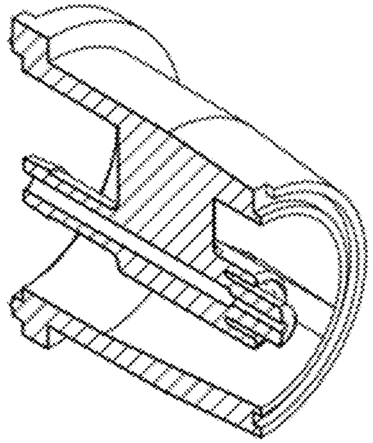

Reference is now made to FIGS. 5 and 6A-6B which show cross-sectional perspective views of an alternative configuration for the nozzle 212. The cross-section of FIG. 5 shows the electrode cap 250, electrode 252 and liquid tip 254, while the cross-sections of FIGS. 6A-6B show only the liquid tip 254. Like reference numbers in FIGS. 4, 5 and 6A-6B refer to like or similar parts. The nozzle 212 in FIGS. 5 and 6A-6B differs from the nozzle 212 in FIG. 4 in the configuration of the liquid outlet 280 at the tip end of the liquid channel 279 for the liquid tip 254. An annular shroud (hood) 281 surrounds the tip end at the liquid outlet 280. The annular shroud 281 is preferably integrally formed with the central body 270 of the liquid tip and is separated from the tip end at the liquid outlet 280 by an annular gap 282 (located between an inner surface of the shroud 281 and an outer surface of the tip end of the central body 270 at the liquid outlet 280). The forward edge of the annular shroud (hood) 281 may be shaped (such as with a chamfered or filleted edge) to concentrate the electric field between the liquid outlet and the forward edge. The distal end of the annular shroud 281 is recessed from the tip end at the liquid outlet 280 by an offset in the direction away (i.e., rearwardly) from the spray outlet. In this configuration, the surface between the electrical standoff 272 and the outlet of the liquid tip is interrupted by the annular shroud (hood) 281 (presenting an air gap and shielded interior) surrounding the liquid tip. The shroud functions to increase electrical insulation of the liquid tip with respect to other surfaces.

The air gap 282 between the hooded feature of the liquid tip is kept small so as to maintain the forward edge surface in close proximity to the liquid emitted and atomized at the outlet. Surface charge on this forward edge creates a passive electrode that is the same polarity as the active electrode 252 and creates an electric field to act as an additional induction electrode (called passive since it is not directly connected). Outer surfaces of the hood 281 surrounding the liquid tip are separated from the liquid tip by an air gap 282. This configuration maintains a voltage differential and establishes an electric field between the liquid at the tip and the charged surfaces of the hood. It is important to keep the interior surfaces within the air gap of the hooded features nonconducting to maintain this potential difference. The flow of clean and dry air helps with keeping these inner surfaces non-conducting.

The annular shroud (hood) 281 around the liquid tip is positioned in close proximity to the tip outlet, and in fact surrounds liquid tip with an air gap 282 that aids in reducing major electrical leakage paths from electrode to liquid tip due to gross contamination of insulating surfaces. These major leakage currents can reduce the electrostatic power supply potential and require the use of higher wattage power supplies. Minor leakage currents on surface films exist on the nozzle's interior surfaces and the surface potentials of the films are advantageously used to supplement the spray charge. Leakage from the active electrode increases the potential of the surfaces to create the passive electrode(s). Once the surface of the annular shroud (hood) 281 becomes polarized and nears the potential of the electrode 252, the surface serves to induce additional charge on the spray. The annular shroud (hood) 281 at the liquid tip surrounds the outlet. An air gap surrounds an internal insulating surface, protected from surface contamination, that electrically separates the surfaces of the hood from the liquid tip outlet.

The nozzle 212 in FIG. 5 further differs from the nozzle 212 in FIG. 4 in the configuration of the electrode cap 250. An annular shroud (hood) 283 surrounds the first portion of the central bore in the electrode cap 250 in a position which is laterally adjacent the tip end at the liquid outlet 280 of the liquid tip. The annular shroud 283 is preferably integrally formed with the body of the electrode cap 250 and is separated from the proximal end where connection is made to the liquid tip 254 by an annular gap 284 (located between an outer surface of the shroud 283 and an inner surface of the end of the body). The shroud functions to help with electrical isolation of the electrode area, reducing leakage current that reduces spray charging. The forward edge of the annular shroud (hood) 283 may be shaped (such as with a curved shape or chamfered or filleted edge) to concentrate the electric field.

It will be noted that once the surfaces of the annular shroud (hood) 281 and/or annular shroud (hood) 283 become elevated to the potential of the electrode, these surfaces will act as supplemental induction electrodes that enhance spray charging. In applications where a highly conductive liquid is being sprayed, it is preferred to use both hood 281 and hood 283.

Figure 6C:
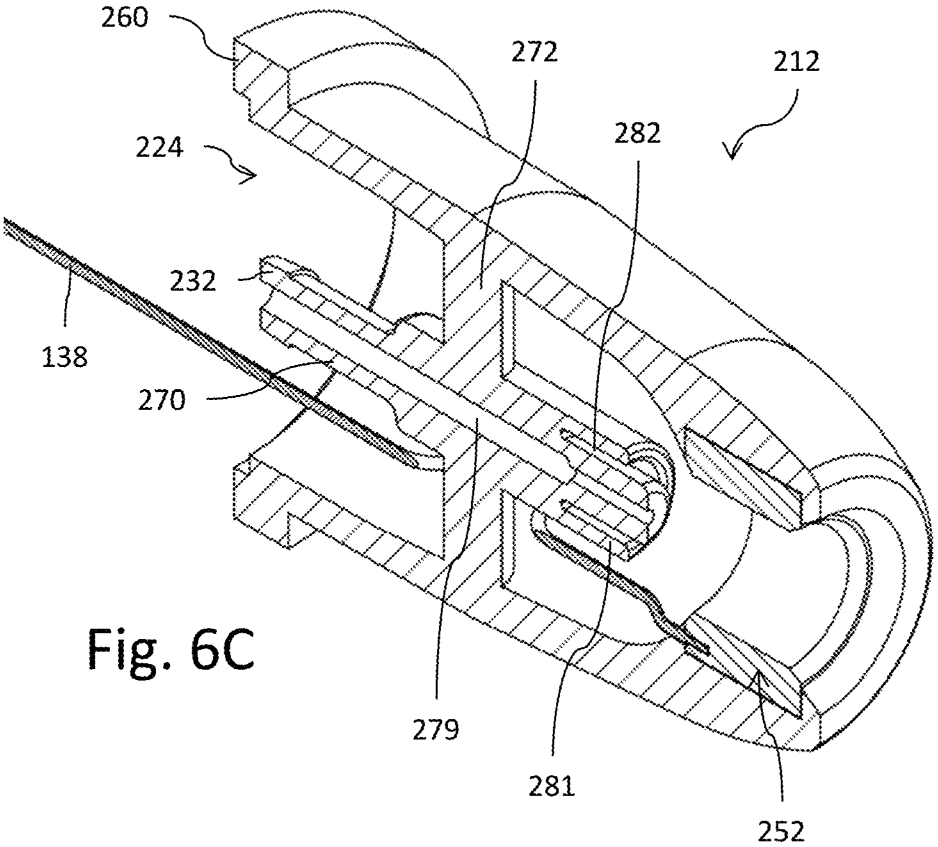
FIGS. 6C, 6D and 6E show perspective cross-sectional views for further alternate configurations of the nozzle assembly.

Reference is now made to FIG. 6C which shows a perspective cross-sectional view for a further alternate configuration of the nozzle assembly. Like reference numbers refer to like or similar parts. FIG. 6C differs from FIG. 5 in that annular shroud (hood) 283 surrounding the first portion of the central bore in the electrode cap 250 has been omitted. So, only the annular shroud (hood) 281 surrounding the tip end at the liquid outlet 280 is included. FIG. 6C further differs from FIG. 5 in that the power line 138 (electrode wire) connected to the electrode 252 is routed through the central bore of the nozzle assembly. It will be noted that this routing of the power line 138 also be implemented in the embodiment of FIGS. 5 and 6A-6B, and this is shown, by example, in FIG. 6D which shows a perspective cross-sectional view for a further alternate configuration of the nozzle assembly.

Figure 6D:
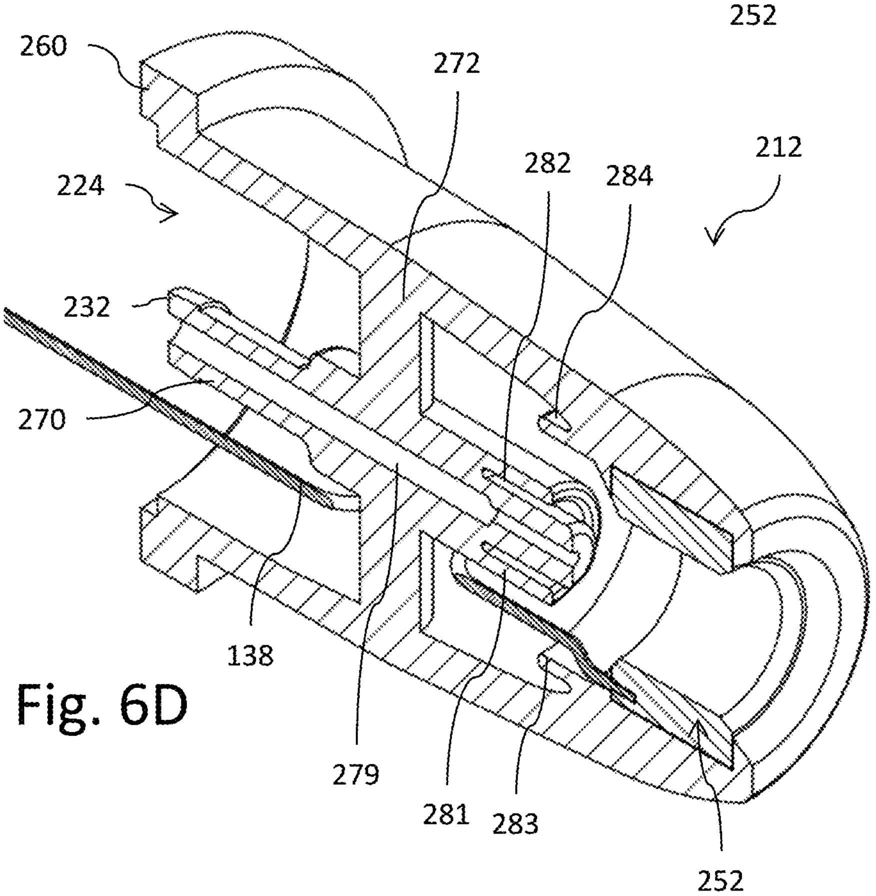
Figure 6E:
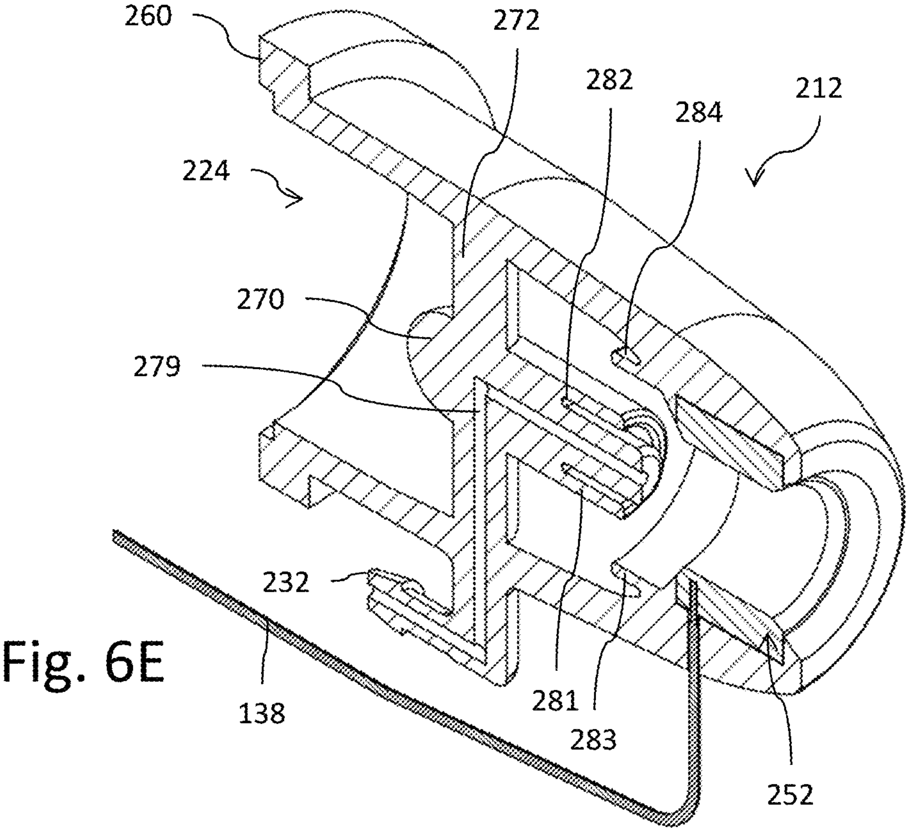

Reference is now made to FIG. 6E which shows a perspective cross-sectional view for a further alternate configuration of the nozzle assembly. Like reference numbers refer to like or similar parts. FIG. 6E differs from FIG. 5 in that the liquid channel 279 of the liquid tip 254 extends from the liquid inlet 232 of the nozzle 212 through one standoff 272 and continues through the central body 270. It will be noted that the routing of the power line 138 shown in FIGS. 6C and 6D can also be implemented in the embodiment of FIG. 6E.

The embodiments of FIGS. 6C, 6D and 6E further differ from the embodiments of FIGS. 5, 6A and 6B in that the nozzle assembly is formed by a unitary (or integral) body. In other words, the nozzle assembly does not include separate electrode cap 250 and liquid tip 254 structures. In this configuration, the electrode 252 is installed (for example, press fit) into the unitary body which includes an electrode cap portion and a liquid tip portion. Any suitable fabrication process, such as 3D printing, can be used to form the unitary (or integral) body. It will, however, be noted that the structures shown in FIGS. 6D and 6E can instead be made of multiple parts assembled together in a manner like that shown in FIGS. 5 and 6A-6B with cap separable from the liquid tip in order to support cleaning, repair and/or replacement operations.

For the embodiments as shown in FIGS. 5 and 6A-6E, the hooded feature provided by the annular shroud (hood) 281 and/or the annular shroud (hood) 283 serves to improve charging consistency with very conductive liquids (such as disinfectants and pesticides) while using a reduced current level which permits the use of a relatively lower power and smaller electrostatic power supply. The presence of the hood feature(s) improves charging of very conductive sprays, such as disinfectants, as the outer surface and the forward edge of the hood eventually becomes slightly coated with conductive film and this forms a passive electrode having the same polarity as the nozzle's active electrode 252. As a result, there is an enhanced induction charging of the spray due to the surface being in close proximity to the dielectric liquid tip channel and outlet. The forward edges of the hoods can be selectively shaped (rounded, sharpened, etc.) to enhance the electric field created by the passive electrodes.

In a preferred embodiment, the annular shroud (hood) 281 for the liquid tip hood is formed integral to the shaft of the liquid tip. Alternatively, the annular shroud (hood) 281 is provided as a separate piece that is attached to the shaft of the liquid tip. In this implementation with a separate piece, the annular shroud (hood) 281 can be made of a dissimilar insulating material selected to enhance the passive electrode effect. The annular shroud (hood) 283 near the electrode could be formed as part of (i.e., integral to) the insulating material in the air channel. Alternatively, it could be a separate piece mounted at the air channel. In this implementation with a separate piece, the annular shroud (hood) 283 can be made of a dissimilar insulating material selected to enhance the passive electrode effect.

Reference is once again made to FIGS. 3A, 3B and 3C. In the example embodiment as illustrated where the spray device 100 has the shape and configuration of a handgun, the housing 300 of the spray device 100 includes a barrel portion 302 which encloses the nozzle assembly 140 (including nozzle 212), the distal end of the air tube 122, the air supply control button 110, the electrical controller 111, the electrostatic power supply 134 and the check valve 137. In an embodiment, the barrel portion 302 may comprise removable nozzle cover 303 that mounts to the spray device 100 in a position which covers the spray nozzle assembly 140. This configuration is advantageous in terms of servicing of the spray device 100 as only the nozzle cover 303 need be removed to service (or replace) the components of the spray nozzle assembly 140 (in particular, service the electrode cap 250 (with electrode 252) and/or the liquid tip 254). It will be noted that the nozzle cover 303 is tapered around the nozzle assembly with a progressively smaller cross sectional area towards the location of the spray outlet, where this tapered shape advantageously entrains ambient air from external of the housing with the nozzle air jet emitted at the spray outlet to reduce instances and likelihood of charged spray wrap back to the operator or the housing 300. The housing 300 of the spray device 100 further includes a handle portion 304 which extends from a bottom of a rear end of the barrel portion 302 and which encloses the proximal end of the air tube 122, the proximal end of the liquid tube 126, the spray control button 115, the electrical controller 116, the control lines 112 and 117, the power supply line 121. The handle portion 304 further supports the connection of the spray device 100 an end of the handle portion to the tether 104 and a flexible strain relief structure 305 assists in making a resilient connection to the tether. The housing 300 of the spray device 100 still further includes a guard portion 306 which extends from the end of the handle portion 304 to a bottom of a front end of the barrel portion 302 and which encloses the liquid tube 126 and the liquid grounding element 136. It will be understood that in an alternative embodiment the guard portion 306 may be omitted in which case the liquid tube 126 would be enclosed by the handle portion 304 and the barrel portion 302. The housing 300 is made of a non-conductive (i.e., electrically insulating) material, or alternatively a semiconductive, electrostatic dissipative material. There is an advantage to forming at least the handle portion 304 from the semiconductive, electrostatic dissipative material with an electrical coupling (for example, resistive) being made from that material to the low voltage side of the electrostatic power supply 134. This ensures that the operator is at the same potential as the low voltage side.

In an alternative shape and configuration for the spray device 100, the housing 300 may have a wand or rod shape which encloses the components.

Figure 7:
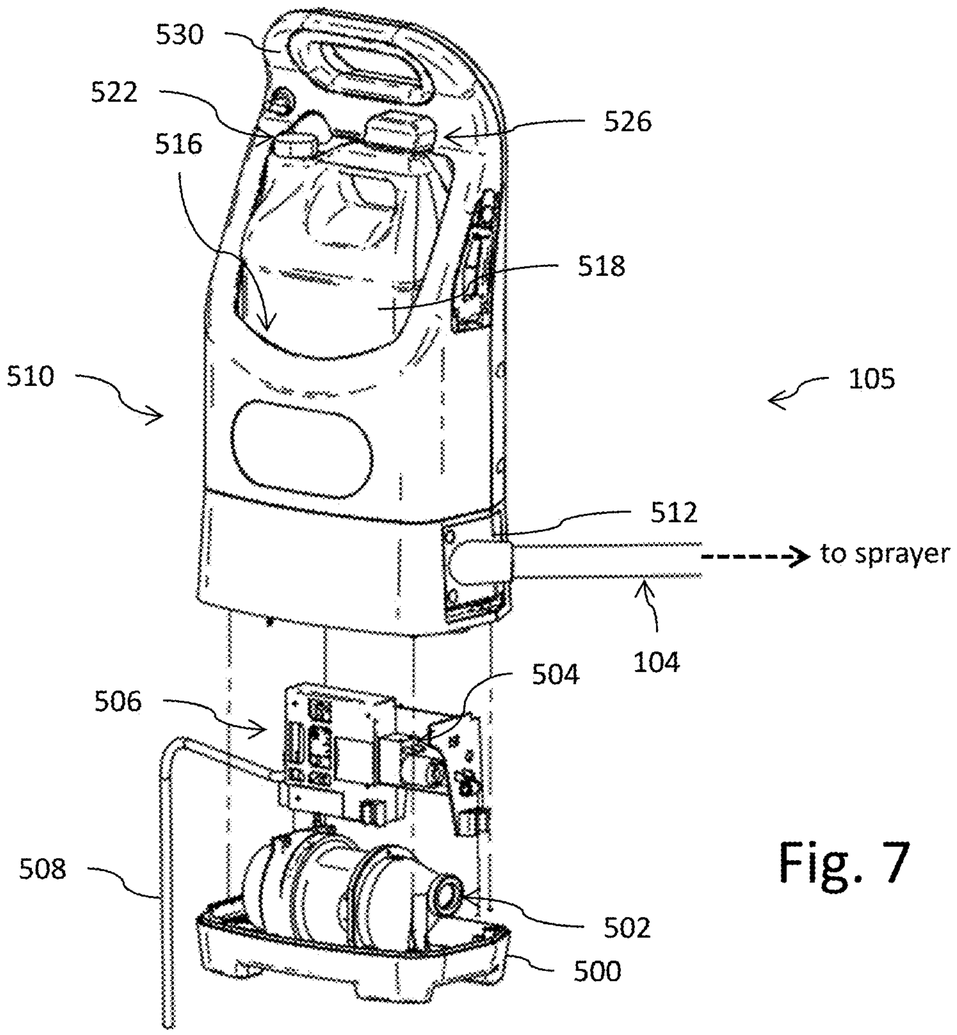
FIG. 7 is an exploded perspective view of the base unit for the electrostatic spray system.

Reference is now made to FIG. 7 which shows an exploded perspective view of the base unit 105. The base unit 105 may be carried by the operator 103 in a backpack configuration as shown in FIG. 1A or towed by the operator in a floor cart configuration as shown in FIG. 1B. FIG. 7 shows the backpack configuration, but it will be understood that the primary difference with respect to the floor cart configuration would be the addition of wheels (reference 390, FIG. 1*i*). The base unit 105 includes a base support 500. A low pressure air source 502, for example implemented as an air turbine unit including a motor (either AC or DC) having a rotor output shaft mounted to a fan unit, is attached to the base support 500. The spinning of the fan unit by the motor provides a low pressure air flow that is output to pass through the air line of the tether 104 and imparts heat to the air (reducing humidity and condensation). Heating the air effectively reduces water condensation inside the nozzle that can cause electrical leakage currents on insulating surfaces which reduce voltage differential between liquid tip and electrode and also cause the electrode power supply to short circuit. In a preferred implementation, the source 502 provides dry (low humidity, for example, less than 50%) air at a temperature of at least 5-10 degrees Centigrade above ambient at a pressure in the range of 1-5 psi. The operation of the source 502 to heat the air from ambient (approximately 22° C. or 71° F.) to operating (approximately 37° C. or 98° F.) temperature for spraying is shown in FIG. 9 to occur within just a few minutes of operating time. This higher than ambient operating temperature for the air provided by source 502 effectively dries the atomizing air for the nozzle and provides for improved spray performance by reducing humidity and condensation along the spray nozzle. A liquid pump 504 is provided within the base unit 105 and may be mounted to the low pressure air source 502 and coupled to the tether 104. An electric circuit module 506 is provided within the base unit 105 and may be mounted to the low pressure air source 502 and coupled by the tether 104 to the spray nozzle. The electric circuit module 506 includes the control circuitry for controlling operation of the low pressure air source 502, controlling operation of the liquid pump 504 and providing the supply voltage for the electrostatic power supply (reference 134, FIG. 3A). The electric circuit module 506 is further coupled to the control lines 112 and 117 and the power supply line 121 of the tether 104. An electrical line 508 is connected to the electric circuit module 506. In an embodiment where the spray system is powered from the AC mains, the electrical line 508 is an AC power cord with a suitable male electrical plug which includes a grounding connection (see, FIG. 10A). Conversely, in an embodiment where the spray system is battery powered, a battery (see, FIG. 10B) is mounted within the base unit 105, and a floor tether 113 is provided which extends from the base unit to make contact with the floor. This ensures a common electrical reference potential for the system and the operator who is standing on the floor. In an embodiment, the floor tether 113 is made of a conductive or semiconductive elastic band. The actuation functions are controlled by the electric circuit module 506 so that the electrostatic charging voltage is applied to the electrode 252 only when the low pressure air source is running and the liquid pump is running so that both air and liquid are flowing through the nozzle. In other words, the control circuit controls the electrostatic power supply so that it is not turned on in situations where the air turbine is not activated. The control circuit may also incorporate a delay for the liquid flow control to allow the air turbine to turn on and come up to desired pressure before liquid is presented for atomization.

The base unit 105 further includes a cover housing 510 that mounts to the base support 500 and encloses the low pressure air source 502, the liquid pump 504 and the electric circuit module 506 (as well as the battery in the battery powered implementation). A connection structure 512 supports the coupling to the tether (with air, liquid, power and control lines) to the base unit 105. The cover housing 510 includes an opening 516 that is configured to receive and secure a liquid tank 518. The liquid tank may be a commercially available product prefilled with the liquid to be sprayed, and the opening 516 is sized and shaped to receive that tank. Alternatively, the tank may be a refillable container. A liquid connector 522 provides a connection for the liquid pump 504 to draw liquid from the liquid tank 518, with an opposite end of the connection coupled to the input of the liquid pump 504. The liquid connector 522 is attached to the tank in place of, for example, the cap which is typically used to close the tank. A latch 526 is provided to retain the liquid tank 518 within the opening 516. The cover housing 510 includes a handle 530 to permit the user to easily carry and manipulate the base unit 105.

Figure 8:
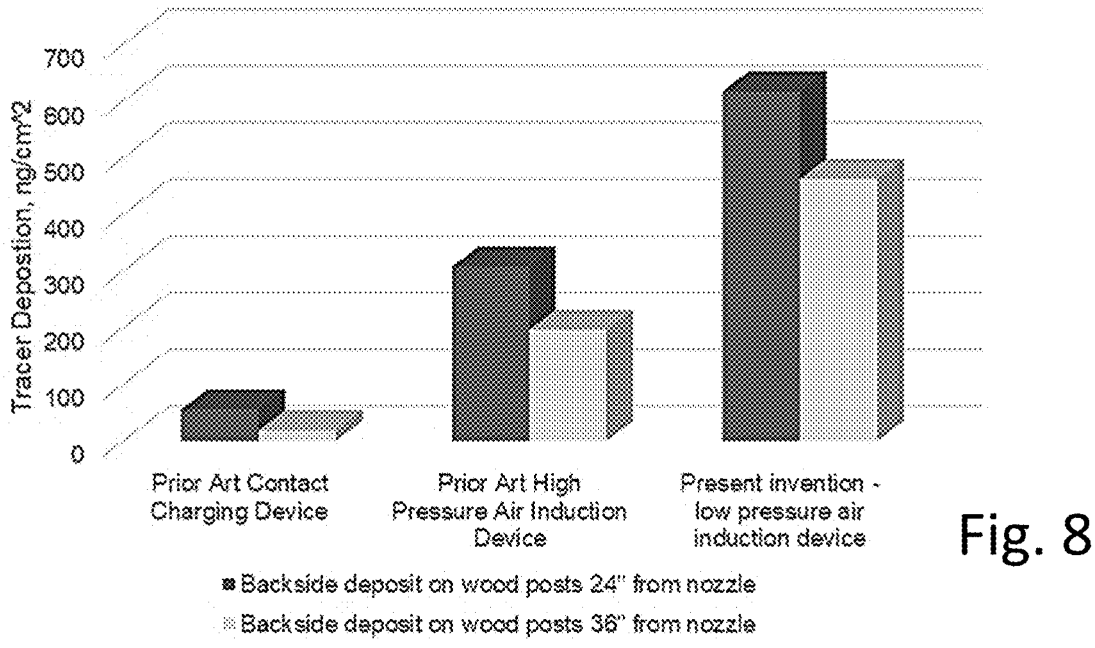
FIG. 8 is a bar graph showing a comparison of wrap-around deposition of liquid for various spray systems.

Reference is now made to FIG. 8 which is a bar graph showing wraparound deposition of liquid for the low pressure induction charging spray system as disclosed herein in comparison to prior art spray systems which use contact charging (for example, of the type as shown in U.S. Pat. No. 10,589,298) and which use high pressure air induction charging (for example, of the type as shown in U.S. Pat. No. 9,138,760). Superior performance of the low pressure induction charging spray system for both near (e.g., 24 inches) and far (e.g., 36 inches) backside target surfaces (in this test, relating to a wood post target) is achieved.

Figure 10A:
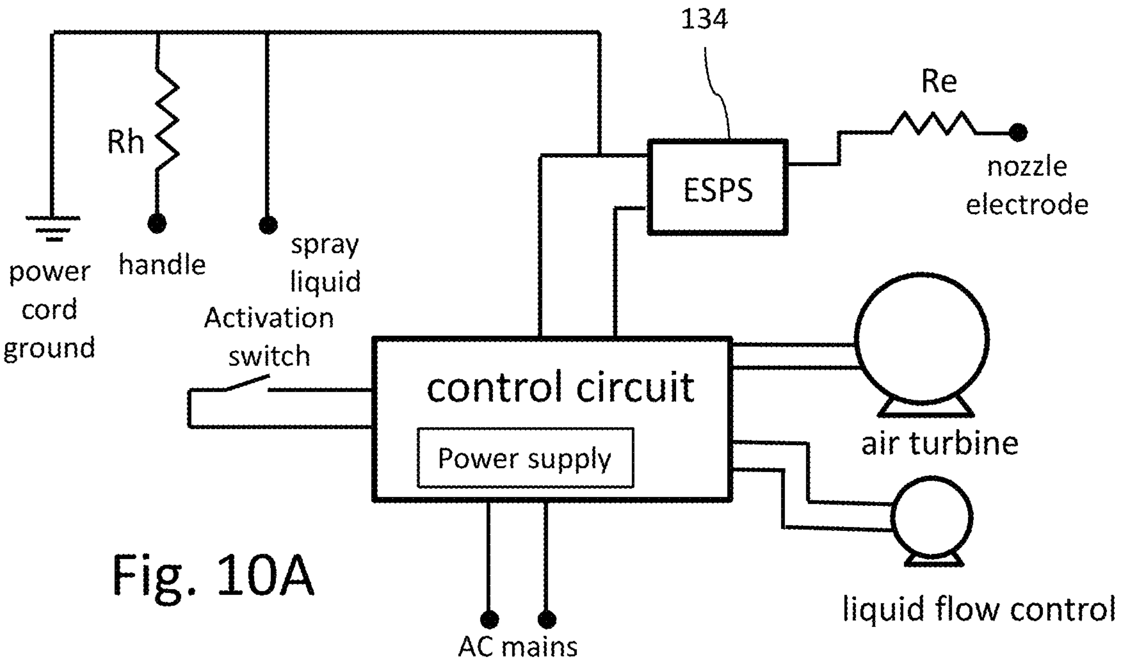
FIGS. 10A, 10B and 10C illustrate a general circuit diagram for the spray system.

FIG. 10A shows a general circuit diagram for the system of FIGS. 1A and 1B with actuation switch (controller 116) connected to a control circuit that controls actuation of a low pressure air source (such as an air turbine) and controls actuation of a liquid pump (with a flow controller). The control circuit further provides power to the electrostatic power supply (ESPS) 134 that delivers the electrostatic charging voltage on power line 138 to the nozzle electrode. A resistance Re is provided between the output of the electrostatic power supply and the electrode and functions to limit current and reduces the electrode voltage if excessive current is drawn from the electrode. The ESPS 134 has a ground connection to the ground line of the AC mains power cord, and a ground connection to the spray liquid (for example through an electrical connection to the spray tank and/or liquid delivery tube). The liquid flowing through tubing to the liquid tip is thus in electrical contact with the ground wire of the power cord. The liquid ground connection through the AC power cord can be a direct connection, however it could also be connected through a resistor as protection against a direct short circuit due to a bridge of contamination lodging in the air gap between the liquid and the electrode. In the preferred embodiment, the liquid is grounded at a distance upstream of the nozzle which provides a length of liquid in the liquid tube that acts as a resistive path when operating and increases in resistance when the tubing empties. The induction electrode induces charge to flow from the grounded plug connection through the power cord and through the conductive liquid emerging at the liquid tip near the electrode. Additionally, there is a resistive ground connection provided between a conductive (or semi-conductive) portion of the handle of the spray gun and the ground of the power cord (represented by handle resistance Rh; for example greater than or equal to about 1 mega-ohm). This protects the circuits inside the sprayer and keeps the operator at about the same potential as the spray device (to avoid ESD between person and device). An advantage of the resistive connection is to reduce the risk of shock to the operator. The current through the ground line could be monitored and used to indicate proper operation or a fault condition in spray charging.

Figure 10B:
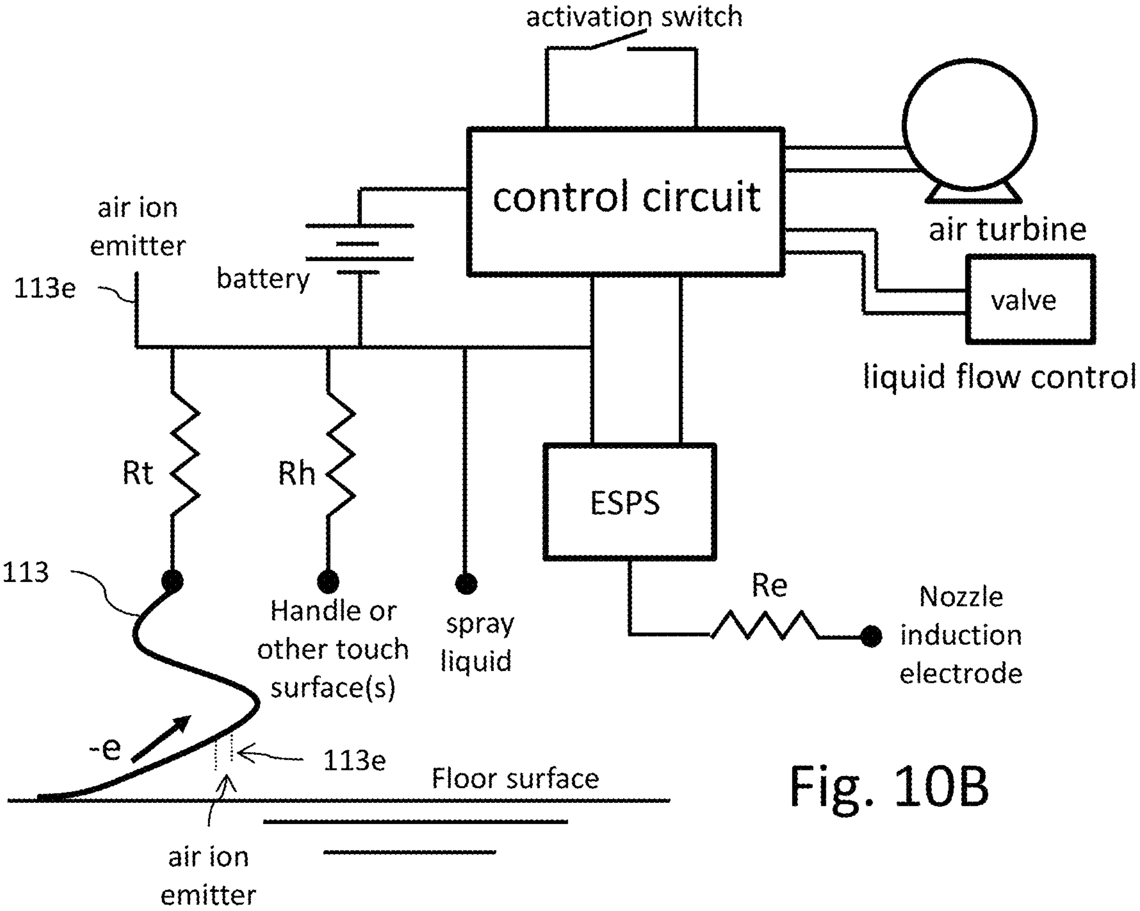

FIG. 10B shows a general circuit diagram for the system of FIGS. 2A, 2B and 2C. The implementation of FIG. 10B is similar to that shown in FIG. 10A except that the power supply is instead provided by a battery and the reference/ground connection is provided through the drag tether 113 with a tether resistance Rt. This resistive connection (e.g., a series resistive path of 1 to 50 mega-ohms) serves to reduce an electrostatic discharge between the tether and the floor or between the spray unit and the operator's body. As previously noted, the drag tether provides electron flow to balance that being emitted by the charged spray from the induction system. The tether provides a more consistent ground connection and thus reduces the chance of user shocks compared to prior art solutions such as the use of foot straps or wearable devices of the type that contact the skin of the wrist or the ankle. The advantage of the tether 113 is to reduce current flowing through the operator and provide protection even when the operator is wearing insulating shoes and/or gloves. Additionally, an air ion emitter 113*e* provided at the device 100 (FIG. 2B) for example, such as a sharp conductive point or wire (made for example, of carbon fiber, conductive plastic or metal wire), may be electrically coupled to the drag tether circuit to limit system charge buildup in situations where the tether 113 is absent or loses optimum contact with the ground or for very dry operating environments with highly insulating floors. The tether 113 is meant to always be in contact with the floor; however, if it is lifted, the voltage of the induction system can rise well beyond the electrode voltage due to depletion of electrons from the operator and the spray system due to continued emission of the charged spray. To reduce this effect, the ion emitter 113*e* connected to the circuit will begin to discharge once system potential climbs to corona onset levels. The control circuit may be configured to detect situations where the tether is not in good contact with the floor surface or is absent, (i.e., where the conductive tether is not providing a satisfactory charge path contact to ground), and in response thereto take warning and/or protective actions to limit system charge buildup and prevent emitter voltage from being raised to corona onset levels. Additionally, the current through a ground line to the liquid could be monitored and used to indicate proper operation or a fault condition in spray charging. The air ion emitter 113*e* may be provided in association with the spray device 100. More preferably, one or more air ion emitters are included in the tether 113 (at a position that would be located about 4 to 12 inches from the distal end of tether 113 or from the floor (ground) reference during normal operation of the system). It will be noted that in the control circuit shown in FIG. 10B the liquid flow control could be provided by pump instead of a valve.

Figure 10C:
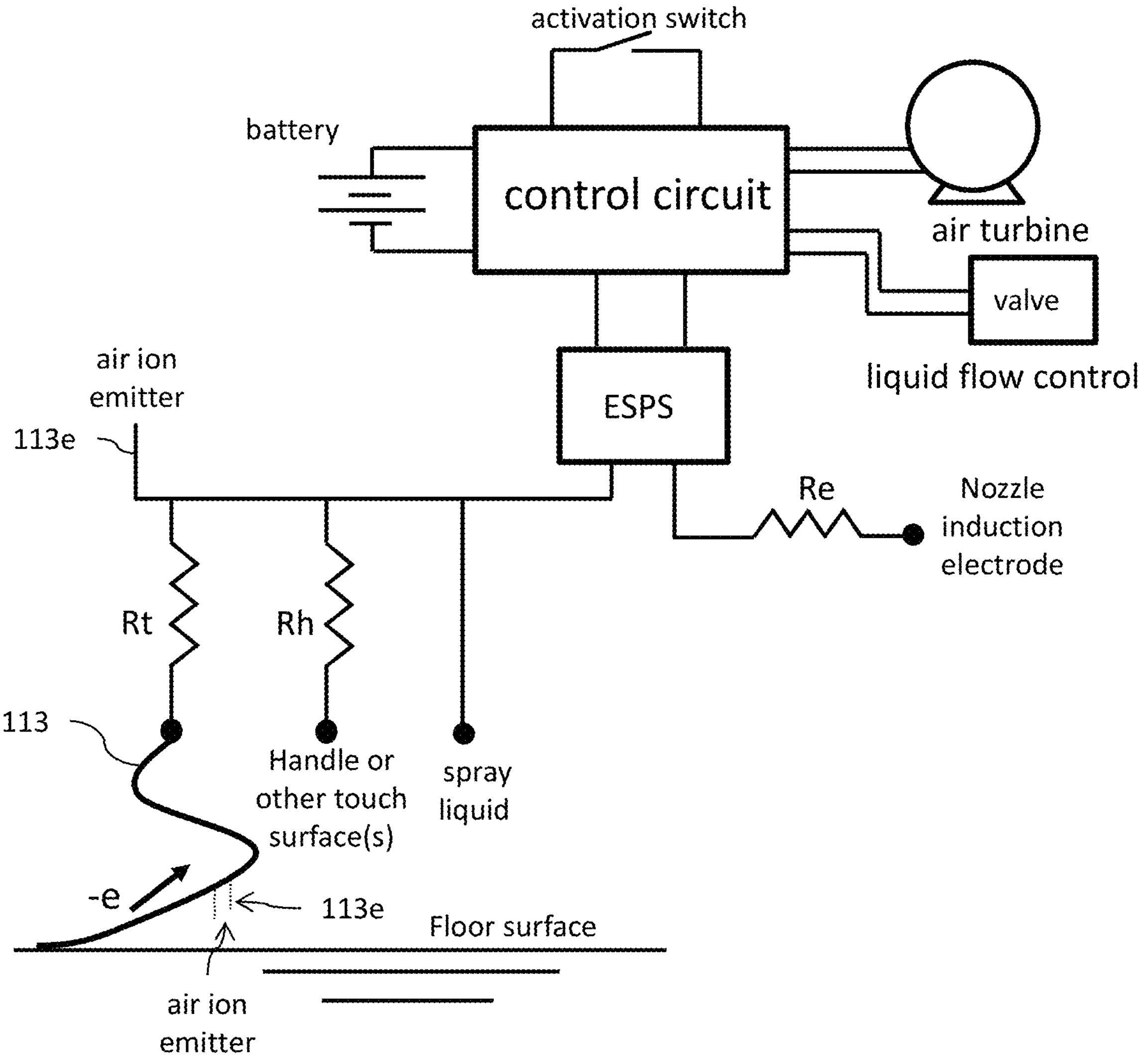

FIG. 10C shows an alternate embodiment for the general circuit diagram. FIG. 10C differs from FIG. 1B in that the power supply (battery) ground is not shared in common with the ground of the ESPS 134. In this embodiment, a transformer is provided to create an isolation between input and output low voltage wires. The output high voltage has its own ground (isolation transformer configuration).

Figure 11A:
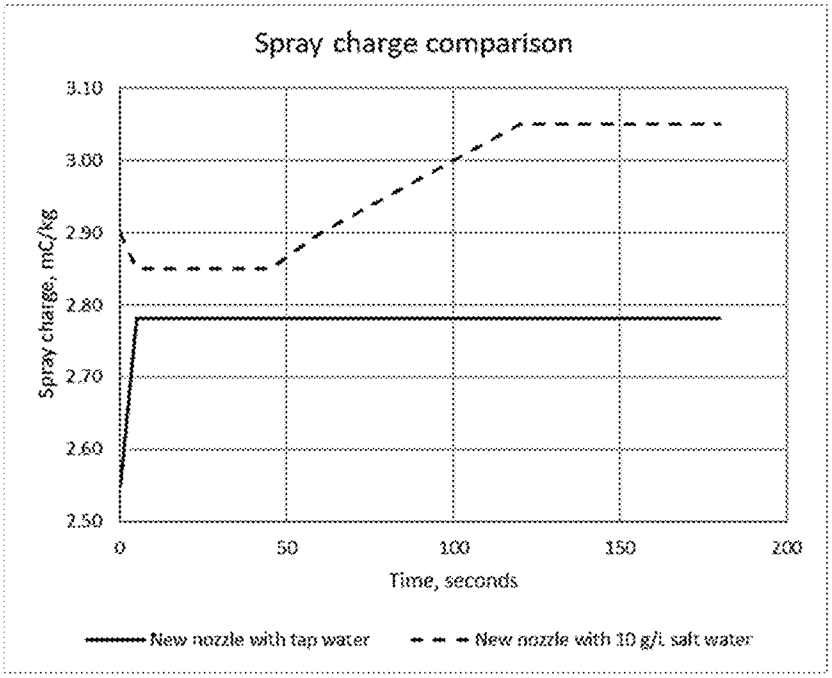
FIGS. 11A and 11B show graphs of spray charge as a function of time.
Figure 11B:
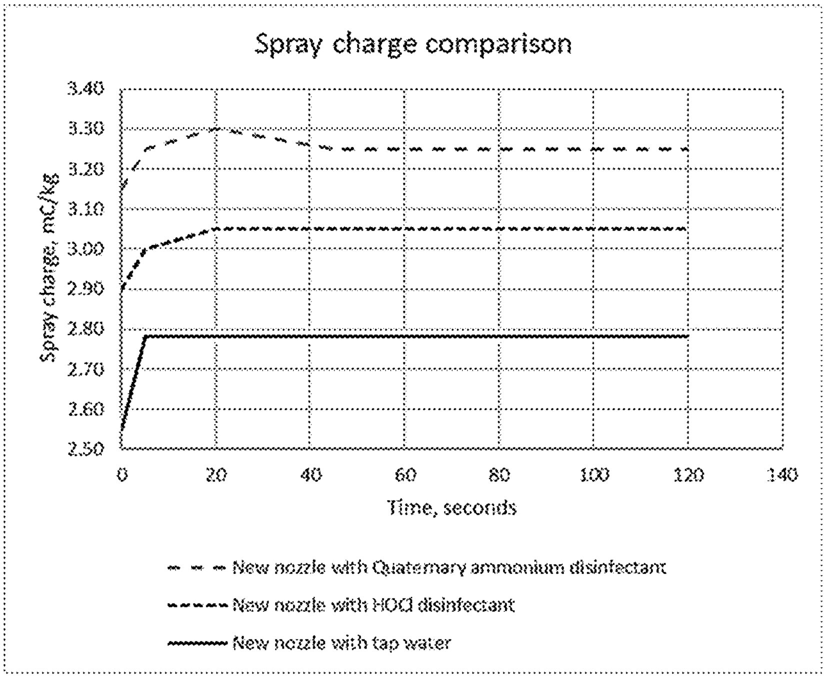

Reference is now made to FIG. 11A which shows a graph of spray charge as a function of time for the nozzle 212 (for example, having the configuration shown in FIGS. 5, 6A and 6B) with respect to the electrostatic spraying of tap water versus saltwater. This graph illustrates the improved spray charge performance of the nozzle 212 when spraying a highly conductive liquid. In this case, tap water has a resistivity of 7,100 ohm-cm and saltwater (at 10 g/L) has a resistivity of 100 ohm-cm. Similarly, FIG. 11B shows a graph of spray charge as a function of time for the nozzle 212 (for example, having the configuration shown in FIGS. 5, 6A and 6B) with respect to the electrostatic spraying of tap water versus Hypochlorous acid (HOCl) and Quaternary Ammonium disinfectant solutions. This graph illustrates the improved spray charge performance of the nozzle 212 when spraying a highly conductive liquid. In this case, tap water has a resistivity of 7,100 ohm-cm, HOCl has a resistivity of 140 ohm-cm and Quaternary Ammonium disinfectant has a resistivity of 82 ohm-cm.

It is accordingly clear that the nozzle 212 increases spray charge with very conductive solutions compared to tap water. This addresses a concern experienced with prior art versions of induction and contact charging nozzles. For example, in prior art induction systems there is a noted decrease in spray charge when heavy salt water or disinfectants are used due to leakage currents raising the voltage of the liquid to near that of the electrode and loading on the electrostatic power supply. In the case of contact charging devices, where voltage is applied directly to the liquid, there is a decrease in spray charging due to leakage currents from the liquid to sprayer surfaces.

Figure 13:
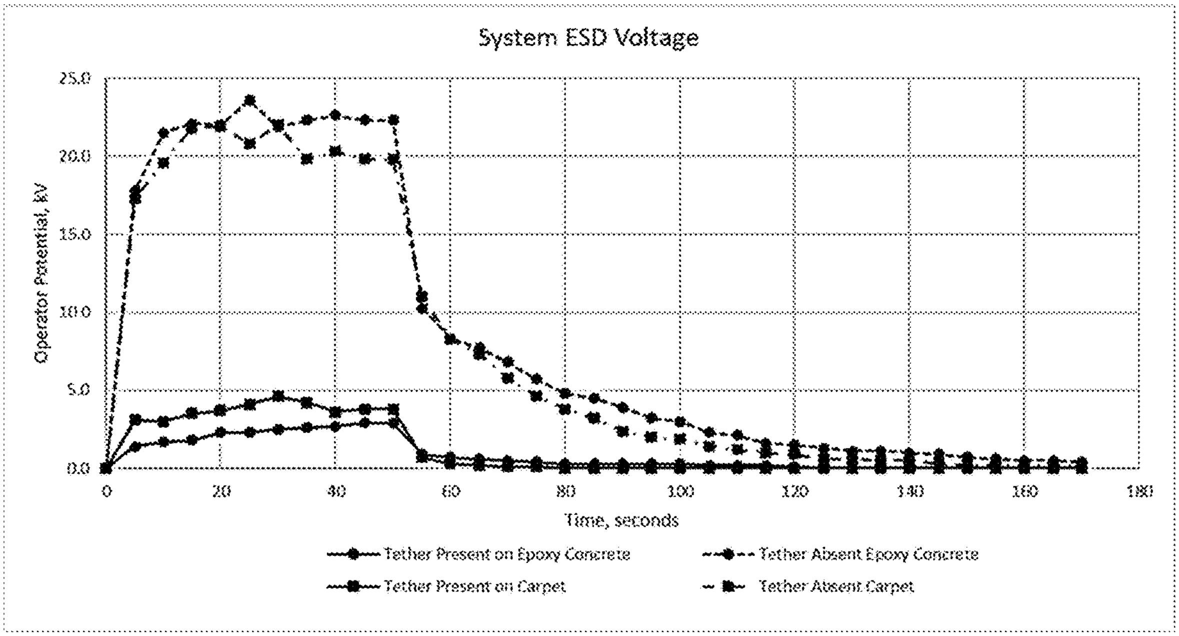
FIG. 13 shows a graph of operator ESD potential as a function of time comparing use of the drag tether.

The advantage of utilizing the floor drag tether 113, for example in the embodiment of FIGS. 2A, 2B and 2C, is further illustrated in FIG. 13 which shows a graph of operator ESD potential as a function of time comparing operation where the floor drag tether 113 is utilized versus operation where the floor drag tether 113 is not utilized. Electrostatic spray is turned on at time=0 seconds and is turned off at time=50 seconds. In the absence of the connected floor drag tether 113, electrostatic charge accumulates quickly on the operator and raises the operator voltage to over 20 kV. This voltage is similar to that which occurs on a person walking across a carpet in a low humidity environment. For these tests, the relative humidity was kept between 30 and 40%. Similar results were observed when operating on vinyl floors and dry asphalt. However, with the floor drag tether 113 connected, the ESD voltage of the operator was significantly reduced for all floor surfaces and stayed consistently low during operation.

Figure 14:
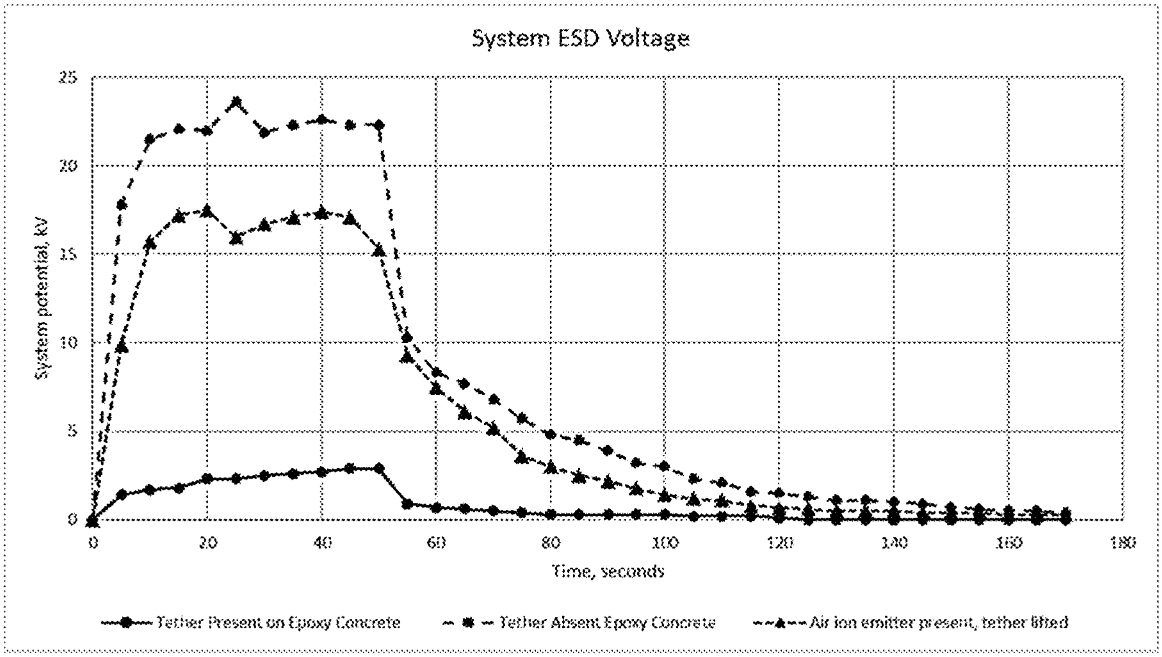
FIG. 14 shows a graph of operator ESD potential as a function of time comparing use of the air ion emitter.

The advantage of the presence of the air ion emitter 113*e* coupled to the drag tether circuit is further illustrated in FIG. 14 which shows a graph of operator ESD potential as a function of time comparing operation where the floor drag tether 113 is utilized versus operation where the floor drag tether 113 is not utilized, versus operation where the air ion emitter 113*e* is present. Electrostatic spray is turned on at time=0 seconds and is turned off at time=50 seconds. In the absence of the connected floor drag tether 113 or inclusion of the air ion emitter 113*e*, electrostatic charge accumulates quickly on the operator and raises the operator voltage to over 20 kV. If the air ion emitter 113*e* is present, even in the absence of the floor drag tether 113, there is a significant reduction of about 25% in operator voltage. It will be noted that further reduction in ESD potential can be achieved by positioning the air ion emitter 113*e* as close to the floor as possible. With the floor drag tether 113 connected, the voltage of the operator is still further reduced.

Figure 15:
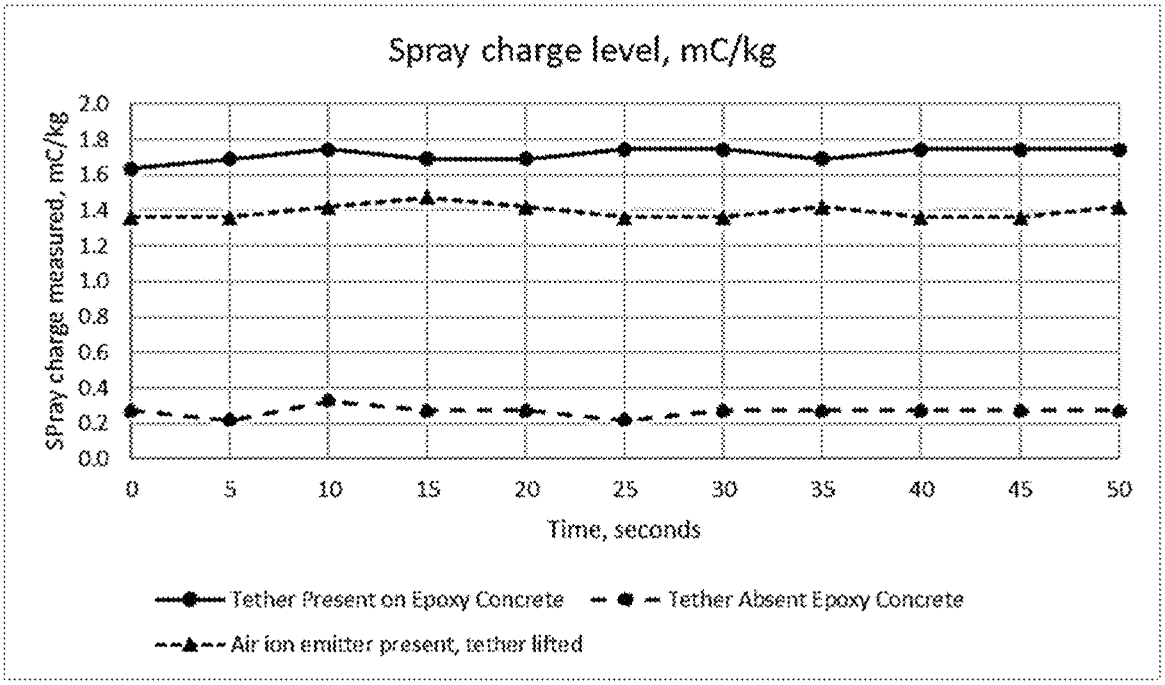
FIG. 15 shows a graph of spray charge as a function of time comparing use of the drag tether and the air ion emitter.

The advantage of the presence of the air ion emitter 113*e* is further illustrated in FIG. 15 which shows a graph of spray charge as a function of time. In the absence of both the floor drag tether 113 and the air ion emitter 113*e*, spray charge levels are low. With use of the floor drag tether 113, however, spray charge levels are high. In a situation where the floor drag tether 113 becomes lifted from the floor (and the ground reference), the benefit of inclusion of the air ion emitter 113*e* in the circuit is readily apparent. The spray charge level is close to that which can be achieved with use of the floor drag tether 113 and well above both the low level achieved in the absence of both the floor drag tether 113 and the air ion emitter 113*e* and further well above a minimum desired level of 1 mC/kg. Note in these graphs the polarity of the ESD voltage is positive and charging currents is negative due to a positive induction electrode. In the case of a negative induction electrode the ESD voltage would be negative and charging currents would be positive.

For negative potential spray charging (i.e., using a positive induction electrode), the resulting ESD voltage is positive due to electron depletion of the system and the operator in the absence of a ground connection through the AC power cord tether or the floor drag tether. This highlights another reason why a high level directed air energy for delivery of the spray away from the operator is critical. If the operator has a strong positive voltage level, it may cause enhanced wrapback of charged spray if the air delivery is not sufficient and a ground tether (or ion emitter) is not used. The safety of the spray system is significantly improved over prior art designs because of reduced ESD, reduced spray wrapback and improved charging and spray deposition uniformity.

Either a positive or a negative electrode voltage could be used. During operation switching between positive and negative electrode polarity could also be employed at low frequency, such as below 1/5 Hz as is known to those skilled in the art. While this bipolar strategy works to reduce ESD voltage buildup, it also reduces the beneficial space charge field, reduces spray charge and causes droplet size to increase due to coalescence. See, Cooper, et al., "Bipolar spray charging for leaf-tip corona reduction by space-charge control," IEEE Trans. IA-23(2):217-223 1987.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The invention claimed is:

1. A spray system, comprising:

a spray device with a spray housing that encloses an electrostatic power supply configured to generate an electrostatic charging voltage and a nozzle assembly including a liquid tip configured to receive a spray liquid and an air stream and atomize the spray liquid to emit an atomized spray at a spray outlet and further including an electrostatic charging electrode electrically coupled to receive the electrostatic charging voltage and configured to inductively charge the atomized spray;

a base unit that includes a liquid source configured to supply the spray liquid, an air source configured to supply the air stream and a power source circuit configured to generate a supply power for the electrostatic power supply; and a tether coupling the spray device to the base unit, wherein said tether includes a liquid supply line coupling the liquid source to the liquid tip, an air supply line coupling the air source to the liquid tip, and a power supply line coupling the power source circuit to the electrostatic power supply;

a liquid grounding element in a liquid tube coupled to supply the spray liquid to said liquid tip, wherein said liquid grounding element is electrically coupled to a low voltage side of the electrostatic power supply;

wherein the spray housing includes a portion made of a semiconductive material and wherein said portion is electrically coupled to said low voltage side of the electrostatic power supply; and an electrical grounding connection of said low voltage side of the electrostatic power supply to ground.

2. The spray system of claim 1, wherein the base unit is configured as a back pack.

3. The spray system of claim 1, wherein the base unit is configured as a towable cart.

4. The spray system of claim 1, wherein the liquid source is a liquid pump fluidly coupled to a tank.

5. The spray system of claim 1, wherein the air source is an air turbine.

6. The spray system of claim 1, wherein the electrostatic charging electrode is mounted in an electrode cap of the nozzle assembly, said electrode cap including a central bore, and said electrode cap being mounted to the liquid tip.

7. The spray system of claim 6, wherein the electrostatic charging electrode is separated from the liquid tip by an air gap.

8. The spray system of claim 1, wherein the liquid tip comprises:

a ring support;

a central body including a liquid channel; and one or more insulating standoffs radially extending outwardly from the central body to said ring support.

9. The spray system of claim 8, wherein the ring support is mounted to an electrode cap including said electrostatic charging electrode, with the one or more insulating standoffs positioning an output of the liquid channel in concentric alignment with an electrode channel of said electrostatic charging electrode.

10. The spray system of claim 9, wherein each insulating standoff is an aerodynamically shaped fin.

11. The spray system of claim 1, wherein the electrical coupling of said portion to the low voltage side of the electrostatic power supply is made through a resistor.

12. The spray system of claim 11, wherein the resistor has a resistance greater than or equal to one mega-ohm.

13. The spray system of claim 1, wherein the spray housing is tapered around the nozzle assembly towards the spray outlet.

14. A spray system, comprising:

a spray device with a spray housing that encloses an electrostatic power supply configured to generate an electrostatic charging voltage and a nozzle assembly including a liquid tip configured to receive a spray liquid and an air stream and atomize the spray liquid to emit an atomized spray at a spray outlet and further including an electrostatic charging electrode electrically coupled to receive the electrostatic charging voltage and configured to inductively charge the atomized spray;

a base unit that includes a liquid source configured to supply the spray liquid, an air source configured to supply the air stream and a power source circuit configured to generate a supply power for the electrostatic power supply;

wherein the base unit further comprises an AC mains power cord connected to the power source circuit; and a tether coupling the spray device to the base unit, wherein said tether includes a liquid supply line coupling the liquid source to the liquid tip, an air supply line coupling the air source to the liquid tip, and a power supply line coupling the power source circuit to the electrostatic power supply;

a liquid grounding element in a liquid tube coupled to supply the spray liquid to said liquid tip, wherein said liquid grounding element is electrically coupled to a low voltage side of the electrostatic power supply and to a ground line of said AC mains power cord; and wherein the spray housing includes a portion made of a semiconductive material and wherein said portion is electrically coupled to said low voltage side of the electrostatic power supply and to the ground line of said AC mains power cord.

15. The spray system of claim 1, wherein the electrostatic charging electrode is electrically coupled to receive the electrostatic charging voltage from a high voltage side of the electrostatic power supply through a resistor.

16. The spray system of claim 15, wherein the resistor is a current limiting resistor.

17. The spray system of claim 1, wherein said nozzle assembly comprises:

an electrode cap including said electrostatic charging electrode, said electrostatic charging electrode including an electrode channel; and wherein said liquid tip comprises: a ring support; a central body including a liquid channel;

and one or more insulating standoffs radially extending outwardly from the central body to said ring support;

wherein the ring support is mounted to the electrode cap with the one or more insulating standoffs positioning an output of the liquid channel in concentric alignment with the electrode channel.

18. The apparatus of claim 17, said nozzle assembly further comprising a central bore extending from a nozzle mounting end to a spray end, the central bore including a first opening portion extending into the electrode cap from the nozzle mounting end, and further including a second opening portion extending into the electrode cap from the spray end, the first and second opening portions meeting at a central air channel that is concentrically aligned with the output of the liquid channel and the electrode channel.

19. The apparatus of claim 18, wherein first opening portion of the central bore extends though the ring support and a distal end of the ring support is mounted to a proximal end of the electrode cap.

20. The apparatus of claim 19, wherein a proximal end of the ring support is configured for making an attachment to an end of the air supply line.

21. The apparatus of claim 18, wherein the electrostatic charging electrode is press fit within the second opening portion.

22. The apparatus of claim 1, further including an air ion emitter electrically connected to said low voltage side of the electrostatic power supply.

23. The apparatus of claim 1, wherein the electrical grounding connection is provided through a floor tether extending from the base unit.

24. The apparatus of claim 23, further including an air ion emitter extending from the floor tether.

25. The spray system of claim 14, wherein the base unit is configured as a back pack.

26. The spray system of claim 14, wherein the base unit is configured as a towable cart.

27. The spray system of claim 14, wherein the liquid source is a liquid pump fluidly coupled to a tank.

28. The spray system of claim 14, wherein the air source is an air turbine.

29. The spray system of claim 14, wherein the electrostatic charging electrode is mounted in an electrode cap of the nozzle assembly, said electrode cap including a central bore, and said electrode cap being mounted to the liquid tip.

30. The spray system of claim 29, wherein the electrostatic charging electrode is separated from the liquid tip by an air gap.

31. The spray system of claim 14, wherein the electrical coupling of said portion to the low voltage side of the electrostatic power supply is made through a resistor.

32. The spray system of claim 31, wherein the resistor has a resistance greater than or equal to one mega-ohm.

33. The spray system of claim 14, wherein the electrostatic charging electrode is electrically coupled to receive the electrostatic charging voltage from a high voltage side of the electrostatic power supply through a resistor.

34. The spray system of claim 33, wherein the resistor is a current limiting resistor.

35. The spray system of claim 14, wherein said nozzle assembly comprises:

an electrode cap including said electrostatic charging electrode, said electrostatic charging electrode including an electrode channel; and wherein said liquid tip comprises: a ring support; a central body including a liquid channel; and one or more insulating standoffs radially extending outwardly from the central body to said ring support;

wherein the ring support is mounted to the electrode cap with the one or more insulating standoffs positioning an output of the liquid channel in concentric alignment with the electrode channel.

36. The apparatus of claim 35, said nozzle assembly further comprising a central bore extending from a nozzle mounting end to a spray end, the central bore including a first opening portion extending into the electrode cap from the nozzle mounting end, and further including a second opening portion extending into the electrode cap from the spray end, the first and second opening portions meeting at a central air channel that is concentrically aligned with the output of the liquid channel and the electrode channel.

37. The apparatus of claim 36, wherein first opening portion of the central bore extends though the ring support and a distal end of the ring support is mounted to a proximal end of the electrode cap.

38. The apparatus of claim 37, wherein a proximal end of the ring support is configured for making an attachment to an end of the air supply line.

39. The apparatus of claim 36, wherein the electrostatic charging electrode is press fit within the second opening portion.

* * * * *